(12) United States Patent
Hatayama et al.

(10) Patent No.: US 9,722,225 B2
(45) Date of Patent: *Aug. 1, 2017

(54) POLYOLEFIN MICROPOROUS MEMBRANE AND SEPARATOR FOR NONAQUEOUS ELECTROLYTE BATTERY

(75) Inventors: Hiroshi Hatayama, Tokyo (JP); Hiroshi Sogo, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/442,355

(22) PCT Filed: Sep. 18, 2007

(86) PCT No.: PCT/JP2007/068085
§ 371 (c)(1),
(2), (4) Date: Mar. 20, 2009

(87) PCT Pub. No.: WO2008/035674
PCT Pub. Date: Mar. 27, 2008

(65) Prior Publication Data
US 2010/0009265 A1    Jan. 14, 2010

(30) Foreign Application Priority Data
Sep. 20, 2006 (JP) ................. 2006-254865

(51) Int. Cl.
*H01M 2/16* (2006.01)
*B01D 71/26* (2006.01)
(Continued)

(52) U.S. Cl.
CPC .......... *H01M 2/1633* (2013.01); *B01D 71/26* (2013.01); *C08J 5/18* (2013.01); *H01M 2/166* (2013.01);
(Continued)

(58) Field of Classification Search
CPC .. H01M 2/1646; H01M 2/166; H01M 2/1653; H01M 2/1633; B01D 71/26
See application file for complete search history.

(56) References Cited

U.S. PATENT DOCUMENTS 6,168,858 B1   1/2001   Hasegawa et al.
6,949,315 B1   9/2005   Samii et al.
(Continued)

FOREIGN PATENT DOCUMENTS

EP    1 698 656 A1    9/2006
JP    2000-208123     7/2000
(Continued)

OTHER PUBLICATIONS

International Search Report mailed on Oct. 23, 2007 in international application No. PCT/JP2007/068085.
(Continued)

*Primary Examiner* — Ula C Ruddock
*Assistant Examiner* — Frank Chernow
(74) *Attorney, Agent, or Firm* — Finnegan, Henderson, Farabow, Garrett & Dunner, LLP

(57) ABSTRACT

The present invention provides a polyolefin microporous membrane made of a polyolefin resin and an inorganic particle, and the puncture strength of the microporous membrane is 3 N/20 μm or more and the membrane thickness retention ratio in penetration creep is 16% or more, thereby being excellent in safety and long-term reliability, and a separator for a nonaqueous electrolyte battery, and the like can be provided.

9 Claims, 3 Drawing Sheets

(51) Int. Cl.
*C08J 5/18* (2006.01)
*H01M 10/0525* (2010.01)

(52) U.S. Cl.
CPC ....... *H01M 2/1646* (2013.01); *H01M 2/1653* (2013.01); *H01M 10/0525* (2013.01); *C08J 2323/00* (2013.01); *H01M 2220/20* (2013.01); *Y02T 10/7011* (2013.01)

(56) References Cited

U.S. PATENT DOCUMENTS

| 7,097,838 | B2 | 8/2006 | Tracey et al. | |
|---|---|---|---|---|
| 7,097,839 | B1 | 8/2006 | Waldman | |
| 2002/0034689 | A1 | 3/2002 | Hoshida et al. | |
| 2005/0019665 | A1* | 1/2005 | Adachi et al. | 429/254 |
| 2006/0024569 | A1 | 2/2006 | Hennige et al. | |
| 2007/0221568 | A1 | 9/2007 | Nagashiki et al. | |
| 2008/0096102 | A1 | 4/2008 | Hatayama et al. | |

FOREIGN PATENT DOCUMENTS

| JP | 2002-69221 | | 3/2002 | |
|---|---|---|---|---|
| JP | 2002-194132 | | 7/2002 | |
| JP | 2003-026847 | | 1/2003 | |
| JP | 2003-082139 | | 3/2003 | |
| JP | 2003-238720 | | 8/2003 | |
| JP | 2003-292655 | * | 10/2003 | ............... C08J 9/26 |
| JP | 2004-010701 | | 1/2004 | |
| JP | 2004-161899 | | 6/2004 | |
| JP | 2005-536857 | | 12/2005 | |
| WO | WO 2005/113657 A1 | | 12/2005 | |
| WO | WO 2006/025323 A1 | | 3/2006 | |

OTHER PUBLICATIONS

Extended European Search Report dated Sep. 30, 2010 issued in corresponding European Application No. 07807485.3-2119.
Notice of Opposition for corresponding EP Application No. 07807485.3 mailed Aug. 27, 2012.
Catalogue entry for KGS-G5 (2007).
Japanese Industrial Standard Polyethelen films for packing Z1702 (1994).
Japanese Industrial Standard General Rules of Plastic Films for Food Packaging JIS Z1707 (1997).
Lithium ion secondary battery—materials and applications, published by The Nikkan Kogyo Shimbun Ltd. (1996).
Nielson, Lawrence, "Mechanical Properties of Polymers and Composites," published by Marcel Dekker (1976).

* cited by examiner

POLYOLEFIN MICROPOROUS MEMBRANE AND SEPARATOR FOR NONAQUEOUS ELECTROLYTE BATTERY

TECHNICAL FIELD

The present invention relates to a microporous membrane suitable for a filtration membrane, a moisturizing membrane, and the like, which require permeability and mechanical strength in an initial stage and creep, and a microporous membrane suitable as a separator for a nonaqueous electrolyte battery excellent in safety and reliability. Further, the present invention relates to a lithium ion secondary battery using the microporous membrane as a separator.

BACKGROUND ART

A microporous membrane has various porous diameters, porous shaped, and the porous numbers, and has been utilized in wide variety of fields due to characteristics capable of exhibiting by its specific structure. For example, a microporous membrane is used as, for example, a separating membrane used for a water treatment, concentration, etc, utilizing a sieve effect due to difference in a porous diameter, an adsorption sheet used in materials for water absorption, oil absorption, and deodorant, which utilize a large surface area and a porous space with microporousness, a moisture permeable waterproof sheet utilizing a feature that air and water vapor are permeated but water is not permeated due to difference in a molecular size, a polymer electrolyte membrane and a moisturizing membrane useful for a fuel battery, and the like, which have many functions by filling various materials in porous spaces, and further, a liquid crystal material, and a battery material.

In recent years, from the viewpoints of saving energy and resources on the background of enhancing international global environment protection activities, particularly in the automobile industry, an electrical automobile (PEV) and a hybrid automobile (HEV) have been positively introduced and studied, and as motor driving power and auxiliary power thereof, a fuel battery and a large lithium ion secondary battery have been actively developed. Further, an electrical double layer capacitor capable of charge and discharge of large current immediately has been expected as an auxiliary power for HEV and its development has been promoted. In a lithium ion secondary battery and an accumulator battery such as an electrical double layer capacitor, a porous membrane keeping an electrolyte therein, called a separator having functions of preventing contact between a cathode and an anode and allowing ion to permeate is provided between the cathode and the anode. It is intensively required for a separator to have high safety along with having a higher energy density of an accumulator battery, and long-term reliability along with development for automobile application, and the like.

However, a shape of an active material of an electrode is not necessarily flat and smooth, and there is a possibility that the active material protrudes through a separator to short-circuit between electrodes, and from the viewpoint of prevention of short-circuit, high puncture strength is desired. Further, when a foreign object such as a fallen active material exists, the electrodes generate swelling and shrinkage by repeating charge and discharge of a battery, and there is a possibility that the foreign object is pushed to the separator for long period of time to thereby penetrate the separator and reach short-circuit. Further, along with having a high energy density and high output, a rolled-up structure and a collector structure are diversified and pressure distribution in a battery is not uniform, and a high pressure may be continuously applied locally on a separator in some cases, and in such cases, there is a possibility to reach short-circuit.

In order to solve these problems of safety and long-term reliability, various studies have been made, but these have not been necessarily satisfactory.

For example, Patent Document 1 discloses a microporous membrane made of polyethylene and polypropylene having high puncture strength and excellent in compression characteristics. However, in the disclosed polyolefin microporous membrane, an effect is exhibited under pressurization for such a short time as 60 seconds, but a concern for the compression characteristics under pressurization for a long time is remained because of being solely polyolefin.

In Patent Document 2, improvement in compression characteristics is proposed by finely dispersing a non-polyethylene thermoplastic resin in a polyethylene microporous membrane. However, in Patent Document 2, since small pores made by craze-form gaps is formed by cleave with the center on the non-polyethylene thermoplastic resin dispersed in polyethylene, a fibril itself forming a porous structure is not reinforced, and thus, a concern on the compression characteristics in a local minute area is remained.

Patent Document 3 discloses a porous membrane made of fillers such as calcium carbonate and barium sulfate, high-density polyethylene, and a low molecular weight compound and stretched longitudinally and laterally and traversely each by 3 times or more. However, the process of Patent Document 3 is a pore developing technique by boundary separation of polyethylene and fillers, a fibril itself forming a porous structure is not reinforced, and thus, a concern on the compression characteristics in a local minute area is remained. Further, since boundary separation is performed by stretching in preference to extension of ramera and rearrangement in the production method, there is a limitation on high puncture strength. Furthermore, since there is a possibility to accidentally generate a void with a large porous diameter in the boundary separation, when using as a separator of a lithium ion battery etc., there is a concern on reliability such as slight short-circuit and self discharge.

Patent Document 4 discloses a porous membrane made of a polyolefin resin containing 20 to 80% by weight of inorganic particles such as anhydrous silicic acid and titanium oxide. However, a draw ratio is as low as about 6 times, and high puncture strength can not be achieved. Further, in the case of stretching by a large ratio, a porous structure is coarsened with a starting point of an agglomerate, and further, membrane rupture is likely to be caused. Patent Document 5 proposes a porous film made of an ultra-high molecular weight polyolefin resin having a weight average molecular weight of 500,000 or more and 5 to 70% by weight of particles having a particle diameter of 0.001 to 10 μm. However, a porous film disclosed in Examples has a draw ratio is as small as 2×2 times, and thus high puncture strength can not be achieved. In addition, no description regarding long-term compression characteristics is shown in Patent documents 4 and 5.

Patent document 6 proposes a separator in which an inorganic material such as alumina, silica and zirconia having an average particle diameter of 5 to 100 nm is present on and in a flexible substrate such as a nonwoven fabric. However, since the substrate is a flexible nonwoven fabric, or the like, there is a limitation on high puncture strength and compression resistance characteristics. Further, inorganic particles are filled in a void part or a surface layer of a nonwoven fabric etc. in a posterior step, and thus a concern such as falling down of inorganic particles is remained.

In Patent Document 7, a polyolefin microporous membrane containing an inorganic particle having high puncture strength is disclosed, but there is no description regarding a particle diameter and a minute area of the inorganic particle and compression resistance under giving a load for a long term.

Patent Document 1: Japanese Patent Application Laid-Open No. 2002-194132
Patent Document 2: Japanese Patent Application Laid-Open No. 2004-161899
Patent Document 3: Japanese Patent Application Laid-Open No. 2003-82139
Patent Document 4: Japanese Patent Application Laid-Open No. 2000-208123
Patent Document 5: Japanese Patent Application Laid-Open No. 2003-26847
Patent Document 6: National Publication of International Patent Application No. 2005-536857
Patent Document 7: WO No. 2006-25323

DISCLOSURE OF THE INVENTION

Problems to be Solved by the Invention

The present invention provides a microporous membrane having both high puncture strength and compression resistance in a minute area, which is preferable for a filtration membrane, a moisturizing membrane, and the like which require permeability and mechanical strength at an initial stage and in creep, and a microporous membrane particularly preferable for a separator for a nonaqueous electrolyte battery which requires to be excellent in safety and long-term reliability.

Means for Solving the Problems

The present inventors focused on importance of compression resistance in a minute area and studied, in order to improve safety such as suppression of shot-circuit and membrane rupture due to a foreign object etc., and long-term reliability in high cycle in a battery and long-term driving in a filtration membrane, and the like, and as a result, the present inventors found that a membrane thickness retention ratio in penetration creep is preferable as an index showing compression resistance in a minute area of a membrane. Then, as a result of repeating further studies, a microporous membrane made of a polyolefin resin and inorganic particles, and characterized by having a puncture strength of 3 N/20 µm or more, and a membrane thickness retention ratio in penetration creep of 16% or more has both high puncture strength and compression resistance in a minute area, and can be used preferably as a separator for a nonaqueous electrolyte battery that is required to be excellent in safety and long-term reliability, and the present invention was thus achieved.

Specifically, the present invention is as follows.

1. A polyolefin microporous membrane, containing a polyolefin resin and an inorganic particle, wherein the microporous membrane has a puncture strength of 3 N/20 µm or more, and a membrane thickness retention ratio in penetration creep of 16% or more.
2. The polyolefin microporous membrane according to 1, wherein the microporous membrane has a membrane thickness reduction rate in penetration creep is 10% or less.
3. The polyolefin microporous membrane according to 1 or 2, wherein a content of the inorganic particle is 20% by mass or more and less than 60% by mass.
4. The polyolefin microporous membrane according to any one of 1 to 3, wherein a particle diameter of the inorganic particle is 1 nm or more and less than 100 nm.
5. The polyolefin microporous membrane according to any one of 1 to 4, wherein the inorganic particle is made of one, or two or more kinds selected from oxides and nitrides of silicon, aluminum and titanium, and carbonates and sulfates of calcium and barium.
6. The polyolefin microporous membrane according to claim 5, wherein the inorganic particle is made of a silicon oxide.
7. The polyolefin microporous membrane according to claim 5, wherein the inorganic particle is made of an aluminum oxide.
8. The polyolefin microporous membrane according to claim 5, wherein the inorganic particle is made of a titanium oxide.
9. The polyolefin microporous membrane according to any one of 1 to 8, wherein an inorganic particle having a hydrophilic group and an inorganic particle subjected to a hydrophobic treatment are used in combination as the inorganic particle.
10. The polyolefin microporous membrane according to 9, wherein the inorganic particle having a hydrophilic group in a proportion of 1% by weight or more and less than 50% by weight in all inorganic particles and the inorganic particle subjected to a hydrophobic treatment in a proportion of 50% by weight or more and less than 99% by weight in all inorganic particles are used in combination.
11. The polyolefin microporous membrane according to 1, wherein a viscosity average molecular weight of the microporous membrane is 50,000 or more and less than 10,000,000.
12. The polyolefin microporous membrane according to 1, wherein a viscosity average molecular weight of the microporous membrane is 50,000 or more and 500,000 or less.
13. The polyolefin microporous membrane according to 1, wherein a viscosity average molecular weight of the microporous membrane is more than 500,000 and less than 2,000,000.
14. The polyolefin microporous membrane according to any one of 1 to 13, wherein the polyolefin resin is made of a composition containing polypropylene and the polypropylene is contained in an amount of 1% by weight or more and less than 50% by weight in 100% by weight of the polyolefin resin.
15. The polyolefin microporous membrane according to 14, wherein the polypropylene is contained in an amount of 20% by weight or more and less than 50% by weight in 100% by weight of the polyolefin resin.
16. A separator for a nonaqueous electrolyte battery made of the polyolefin microporous membrane according to any one of 1 to 15.
17. A lithium ion secondary battery, wherein the polyolefin microporous membrane according to any one of 1 to 15 is used as a separator.
18. A lithium ion secondary battery for a hybrid automobile, wherein the polyolefin microporous membrane according to any one of 1 to 15 is used as a separator.
19. A method for producing a polyolefin microporous membrane, including the steps of:
(1) melt-kneading a polyolefin resin, an inorganic particle and a plasticizer to obtain a molten substance;

(2) transferring the molten substance and molding into a sheet form, thereafter solidifying by cooling to obtain a sheet;

(3) stretching the sheet at least in a uniaxial direction by a surface stretching ratio of 20 times or more and less than 200 times; and (4) extracting the plasticizer after the stretching step (3), wherein a particle diameter of the inorganic particle in (1) is 1 nm or more and less than 100 nm, and a temperature from transferring the molten substance until molding into a sheet form in (2) is set at higher than a preset temperature in the melt-kneading step.

20. The method for producing a polyolefin microporous membrane according to 19, including stretching in a biaxial direction in the stretching step (3).

Effect of the Invention

The present invention provides a microporous membrane having fine pores and excellent in permeability and mechanical strength in an initial stage and creep. In particular, the present invention can provide a microporous membrane particularly preferable as a separator for a nonaqueous electrolyte battery etc. which are required to be excellent in safety and long-term reliability.

BEST MODE FOR CARRYING OUT THE INVENTION

The microporous membrane of the present invention will be more specifically described in the following, particularly with a focus on preferable embodiments thereof.

A puncture strength of the microporous membrane of the present invention is 3 N/20 μm or more. When it is 3 N/20 μm or more, membrane rupture due to fallen active materials etc. at the time of rolling up a battery can be suppressed. Further, there is less concern on short-circuit due to swelling and shrinkage of electrodes along with charge and discharge. The upper limit is not particularly restricted, but from the viewpoint that width shrinkage due to orientational relaxation at heating can be reduced, 20 N/20 μm or less is preferable. The range is more preferably 4 N/20 μm or more and 20 N/20 μm or less, and further more preferably 5 N/20 μm or more to 10 N/20 μm.

A membrane thickness retention ratio in penetration creep of the microporous membrane of the present invention is 16% or more. The upper limit is not particularly restricted, but when it is 95% or less, the microporous membrane has sufficient flexibility for rolling up, and is easily processed into a rolled-up material when used as, for example, a separator for a battery, thus being preferable. The range is preferably 20% or more and 90% or less, more preferably 25% or more and 80% or less, and further more preferably 25% or more and 60% or less. When it is 16% or more, the microporous membrane is excellent in compression resistance in a continuously pressurized state, and is excellent in reliability.

In the present invention, a technical meaning of using a membrane thickness retention ratio in penetration creep for featuring the polyolefin microporous membrane is on the ground that importance of compression resistance in a minute area of a membrane is found in order to improve safety such as suppression of short-circuit and membrane rupture due to a foreign object etc., and long-term reliability in high cycle in a battery, long-term driving in a filtration membrane, etc.

As an index representing compression resistance in a minute area of a membrane, a membrane thickness retention ratio in penetration creep is employed.

A membrane thickness reduction rate in penetration creep is preferably 10% or less. When it is 10% or less, compression resistance in a continuously pressurized state is excellent, and reliability is excellent. When it is 0.1% or more, the microporous membrane has sufficient flexibility for rolling up, and is easily processed into a rolled-up material when used as, for example, a separator for a battery, thus being preferable. The membrane thickness reduction rate is more preferably 9% or less and 0.1% or more, and further more preferably 8% or less and 1% or more. A final membrane thickness of the microporous membrane is preferably in the range from 2 μm or more to 100 μm or less, more preferably in the range from 5 μm or more to 40 μm or less, and further more preferably in the range from 5 μm or more to 35 μm or less. When the membrane thickness is 2 μm or more, mechanical strength is sufficient, and when 100 μm or less, since an occupied volume of a separator decreases, there is a tendency of being advantageous to the point of having a high capacity of a battery, thus being preferable.

A porosity is preferably in the range from 25% or more to 90% or less, and more preferably from 40% or more to 80% or less, and further more preferably from 50% or more to 80% or less. When the porosity is 25% or more, permeability is hardly lowered, and while when 90% or less, since possibility of self discharge is less when used as a separator for a battery, the membrane has reliability, thus being preferable.

An air permeability is preferably in the range from 10 seconds or more to 1,000 seconds or less, more preferably from 50 seconds or more to 500 seconds or less, and further more preferably from 50 seconds or more to 200 seconds or less. When the air permeability is 10 seconds or more, self discharge is less when used as a separator for a battery, and when it is 1,000 seconds or less, preferable charge and discharge characteristics are obtained, thus being preferable.

The microporous membrane of the present invention has not only a porosity and an air permeability in the ranges advantageous for high permeability, but also all or a part of inorganic particles are fused to polyolefin and affinity to a nonaqueous electrolyte is preferable, and when used as a separator for a nonaqueous electrolyte battery, the microporous membrane has characteristics significantly excellent in, for example, output retention performance and cycle retention performance.

A bubble point of the microporous membrane is preferably 0.3 MPa or more and 2 MPa or less, more preferably 0.5 MPa or more and 1.8 MPa or less, further more preferably 0.7 MPa or more and 1.5 MPa or less. When the bubble point is 2 MPa or less, permeability is preferable, and influence of clogging etc. is less. When it is 0.3 MPa or more, since possibility of self discharge is less when used as a separator for a battery and the membrane has reliability, thus being preferable.

A pore diameter ratio represented by (surface pore diameter)/(cross-section pore diameter) is preferably 0.2 or more and 2 or less. When it is 0.2 or more and 2 or less, balance between permeability and self-discharge is excellent, and the membrane is preferable as a separator for a battery. Pore diameters of a surface layer and a cross-section can be determined by, for example, a scanning electron microscope.

A polyolefin resin used in the present invention refers to a polyolefin resin used for general extrusion, injection, inflation, blow molding, and the like, and homopolymers such as ethylene, propylene, 1-butene, 4-methyl-1-pentene, 1-hexene and 1-octene, and copolymers and multistage polymers, and the like can be used. Further, polyolefin selected from the group of these homopolymers, and copolymers and multistage polymers can be also used alone or in mixture. Typical examples of the above polymers include low-density polyethylene, linear low-density polyethylene, middle-density polyethylene, high-density polyethylene, ultra-high molecular weight polyethylene, isotactic polypropylene, atactic polypropylene, polybutene, and an ethylene propylene rubber. When the microporous membrane of the present invention is used as a battery separator, it is preferable to use a resin containing particularly high-density polyethylene as a main component (for example, 10 parts by mass or more) from the viewpoints of a low melting point resin and required performance of high puncture strength.

A viscosity average molecular weight of a polyolefin resin or a microporous membrane used in the present invention is preferably 50,000 or more and less than 10,000,000. The viscosity average molecular weight of 50,000 or more is preferable since melt tension becomes large during melt-molding, and moldability is likely to be improved, and additionally, it is likely to give sufficient tangle to become high strength. The viscosity average molecular weight of less than 10,000,000 is preferable since uniform melt-kneading tends to be easily obtained, and moldability of a sheet, in particular, thickness stability, tends to be excellent.

A viscosity average molecular weight as a high molecular weight region is preferably more than 500,000 and less than 2,000,000, more preferably 600,000 or more and less than 1,500,000, and particularly more preferably 700,000 or more and less than 1,000,000. The viscosity average molecular weight of more than 500,000 is preferable since a membrane thickness retention ratio and a membrane thickness reduction rate in penetration creep tend to be excellent.

The viscosity average molecular weight of less than 2,000,000 is preferable from the viewpoint that pores can be easily sealed at the time of increasing a temperature and preferable shutdown function is likely to be obtained since when used as a separator for a battery, regardless of containing inorganic particles in such a large amount as 20 to 60% by weight, a melting viscosity is low. In this case, polyolefin in use may be, for example, a mixture of polyethylenes with viscosity average molecular weights of 2,000,000 and 270,000 having a viscosity average molecular weight of the mixture of less than 2,000,000, in place of using polyolefin with a viscosity average molecular weight of less than 2,000,000 alone.

A viscosity average molecular weight as a low molecular weight region is preferably 50,000 or more and 500,000 or less, more preferably 50,000 or more and less than 450,000, and most preferably 100,000 or more and less than 400,000. The viscosity average molecular weight of 500,000 or less is preferable since melt-kneading at a high polymer concentration tends to be easy and improvement in productivity can be expected, and what is more, heat shrinkage tends to be reduced.

From the viewpoint of heat resistance, the polyolefin resin is preferably made of a composition containing polypropylene. In particular, it is preferable to use high density polyethylene and polypropylene by mixing because of making it possible to have both high puncture strength and heat resistance. Polypropylene is preferably contained in an amount of 1% by weight or more and less than 50% by weight in 100% by weight of the polyolefin resin, more preferably 5% by weight or more and less than 40% by weight, and further more preferably 20% by weight or more and less than 30% by weight. The content of polypropylene of 1% by weight or more is preferable since favorable heat resistance can be obtained, and the content of less than 50% by weight is preferable since stretching property tends to be favorable, and a porous membrane with high puncture strength is likely to be obtained. Further, the content of 20% by weight or more is preferable since stretching property is excellent and a microporous membrane excellent in air permeability can be obtained.

A polyolefin resin used in the present invention can be used in mixing with antioxidants such as phenol antioxidants, phosphor antioxidants and sulfur antioxidants, metal soaps such as calcium stearate and zinc stearate, and additives such as an ultraviolet absorbent, a light stabilizer, an antistatic agent, an antifogging agent and a coloring pigment according to necessity, within the range where advantages of the present invention are not damaged.

An inorganic particle used in the present invention preferably has a particle diameter of 1 nm or more and less than 100 nm, more preferably 6 nm or more and less than 80 nm, and further more preferably 10 nm or more and less than 60 nm. The particle diameter can be measured by a scanning electron microscope or a transmission electron microscope. When the particle diameter is less than 100 nm, since separation between polyolefin and the organic particle hardly occurs even in the case of subjecting stretching, and the like, generation of a macrovoid can be suppressed, and since a state of fusing all or a part of the inorganic particles with polyolefin itself is easily maintained, a fibril itself constituting a microporous membrane is likely to become hard, and thus compression resistance performance in a local area is excellent. Further, since the inorganic particles are in such a state of dispersing in polyolefin and fusing therewith, heat resistant also tends to be excellent. The particle diameter of 1 nm or more is preferable from the viewpoint that since dispersibility of the inorganic particles is excellent, compression resistance is excellent also in a local area. Herein, the local area means any area in the microporous membrane, and means that, for example, even when several spots are arbitrarily selected and measured, compression resistance is excellent in all of the spots.

Further, in general, when a composition containing polyethylene and polypropylene is molten and mixed, and solidified by cooling, stretching property is inferior since polyethylene and polypropylene are hardly compatible. However, the case where a particle diameter of an inorganic particle of 1 nm or more and less than 100 nm is preferable since the inorganic particle functions as a nucleating agent of polypropylene, and even if a content of polypropylene is as large as 20 to 50% by weight, phase separation from polyethylene does not proceed in cooling but solidified, thereby exhibiting preferable stretching property.

Further, it is preferable that the inorganic particle used in the present invention has little or no internal surface area inside of a primary particle, that is, has little or no fine pore in the primary particle itself. The inorganic particle that has no or little pore in the primary particle itself refers to an inorganic particle having a porosity (P/S) within the range of 0.1 to 3.0. P/S refers to a ratio of a specific surface area P to a surface area per a unit weight S calculated from a primary particle diameter D (unit: μm) and a density d (unit: g/cm$^3$) of a material constituting the particle. When the particle is spherical, a surface area per one particle is $\pi D^2 \times 10^{-12}$ (unit: m$^2$) and a weight per one particle is $(\pi D^3 d/6) \times 10^{-12}$ (unit: g), and thus a surface area per a unit weight S is $S=6/(Dd)$ (unit: m$^2$/g). The specific surface area P is found from a nitrogen adsorption isothermal curve at −196° C. based on the BET equation.

If such an inorganic particle is used, for example, in the case of using as a separator for a nonaqueous electrolyte battery, there is a tendency that performance deterioration such as reduction in a capacity is hardly generated. The reason is not clear, but if the organic particle has no or little fine pore inside the primary particle, absorbed water and the like can be easily removed in a general drying step, and thus, it is assumed that reduction in a capacity due to mixing moisture is hardly caused. Further, for the same reason, the shape of the particle is preferably spherical more than a layered shape. Such an inorganic particle can be obtained by a gas phase reaction such as a chemical flame method or a plasma method, and for example, by reacting (burning) silicon tetrachloride or titanium tetrachloride in a gas phase in the presence of oxygen, hydrogen, etc., a silicon oxide particle, an aluminum oxide particle, a titanium oxide particle, and the like, which do not have internal fine pores, can be obtained.

On the other hand, an inorganic particle obtained by a solid phase reaction such as a burning synthesis method or a liquid phase reaction such as a precipitation method, or a natural mineral substance can be easily formed into a structure having a fine pore inside of a primary particle or a layered form.

As an inorganic particle used in the present invention, specifically, oxides and nitrides of silicon, aluminum, titanium, and the like, and carbonates and sulfates of calcium, barium, and the like are preferable. Silicon oxide is excellent in view of having a light weight and low cost, and an aluminum oxide is excellent in chemical resistance, and in particular, a titanium oxide is more preferable from the viewpoints that reactivity with fluorinated acid that is possibly generated when used as a separator for a nonaqueous battery is low and a microporous membrane with high permeability can be easily obtained.

Further, as the inorganic particle to be used, an inorganic particle having a hydrophilic group and an inorganic particle subjected to a hydrophobic treatment are preferably used in combination. The inorganic particle having a hydrophilic group is referred to as an inorganic particle having, for example, a hydroxyl group, and the like, and oxides of silicon, aluminum, titanium, which are synthesized in a general production method, have a hydroxyl group on the surface thereof. Examples of the inorganic particle subjected to a hydrophobic treatment include those treated with alkylhalosilane such as dimethyldichlorosilane and trimethylchlorosilane, those treated with alkylsilane such as octylsilane, those treated with alkylsilazane such as hexamethylsilazane, and those treated with alkyl silicone oil or aminosilane.

When an organic particle has a hydrophilic group, in the case of adding an inorganic particle in a system containing a hydrophobic resin such as polyethylene and polypropylene and a plasticizer such as a liquid paraffin and a paraffin wax, a thickening effect in kneading becomes remarkably large, and thus an aggregated particle diameter is likely to be small. In particular, since specific large aggregation tends to be suppressed, stretching with high draw ratio is possible and high penetration strength can be easily obtained. Further, since large aggregation of specific inorganic particles can be significantly reduced, local compression characteristics also tend to be excellent. It is preferable to use the inorganic particle subjected to a hydrophobic treatment from the viewpoint that moisture removal is easy and thus deterioration in battery performance due to moisture can be reduced.

When a proportion of the inorganic particle having a hydrophilic group in all the inorganic particles is 1% by weight or more and less than 50% by weight, and a proportion of the inorganic particle subjected to a hydrophobic treatment is 50% by weight or more and less than 99% by weight, the above described effects can be easily obtained. Preferably, the proportion of the inorganic particle having a hydrophilic group in all the inorganic particles is 1% by weight or more and less than 30% by weight, and the proportion of the inorganic particle subjected to a hydrophobic treatment is 70% by weight or more and less than 99% by weight, and more preferably, the proportion of the inorganic particle having a hydrophilic group in all the inorganic particles is 3% by weight or more and less than 20% by weight, and the proportion of the inorganic particle subjected to a hydrophobic treatment is 80% by weight or more and less than 97% by weight. Further, in place of using the inorganic particle having a hydrophilic group and the inorganic particle subjected to a hydrophobic treatment in combination, it may be possible to employ an inorganic particle alone in which a part of a hydrophilic group is subjected to a hydrophobic treatment. Since it is difficult to control residual of a part of a hydrophilic group and a large amount thereof is subjected to a hydrophobic treatment, it is more preferable to use an untreated inorganic particle having a hydrophilic particle and an inorganic particle sufficiently subjected to a hydrophobic treatment in combination. Determination of a hydrophilic group quantity is known by, for example, measuring by reacting a silanol group (hydrophilic group) with lithium aluminum halide ($LiAlH_4$) in the case of using silica as an inorganic particle, but can be measured also by using other known techniques.

A content of the inorganic particle in a microporous membrane in the present invention is desirably 20% by mass or more and 60% by mass or less based on the whole amount of the microporous membrane. The content is preferably 20% by mass or more and 50% by mass or less. The content of 20% by mass or more is preferable from the viewpoints that heat resistance is improved, a membrane thickness retention ratio in penetration creep is high, a membrane thickness reduction rate is likely to be small, compression resistance in a state of pressurizing for a long time is excellent, and thus reliability is excellent. The content of 60% by mass or less is preferable from the viewpoints that high draw ratio is possible and high puncture strength can be obtained. The content of 40% by mass or more is more preferable from the viewpoint of heat resistance.

One example of a production method for obtaining the microporous membrane of the present invention will be described, but it is not necessarily limited to the example. For example, the polyolefin microporous membrane of the present invention can be obtained by a method including the steps of:

(1) melt-kneading a polyolefin resin, an inorganic particle and a plasticizer to obtain a molten substance;

(2) transferring the molten substance and molding into a sheet form, thereafter solidifying by cooling to obtain a sheet;

(3) stretching the sheet at least in a uniaxial direction by a surface stretching ratio of 20 times or more and less than 200 times; and (4) extracting the plasticizer after the stretching step (3), wherein a particle diameter of the inorganic particle in (1) is 1 nm or more and less than 100 nm, and a temperature from transferring the molten substance until molding into a sheet form in (2) is set at higher than a preset temperature in the melt-kneading step.

A plasticizer added in the step (1) may be a nonvolatile solvent capable of forming a uniform solution at not less than a melting point of a polyolefin resin when mixed with the polyolefin resin. The plasticizer is preferably a liquid at a normal temperature. Examples thereof include hydrocarbons such as a liquid paraffin and a paraffin wax, esters such as dioctyl phthalate and dibutyl phthalate, and higher alcohols such as oleyl alcohol and stearyl alcohol. In particular, when the polyolefin resin is polyethylene, a liquid paraffin has high compatibility with polyethylene because of having no polarity, and since boundary separation of the plasticizer with the resin hardly occurs in stretching, uniform stretching is easily carried out and high puncture strength is easily obtained, thus liquid paraffin is preferable.

An oil absorption amount of a plasticizer in an inorganic particle is preferably 150 ml/100 g or more. It is more preferably 150 ml/100 g or more and 1000 ml/100 g or less. It is further more preferably 150 ml/100 g or more and 500 ml/100 g or less. For example, when a content of the inorganic particle is 20% by mass or more and the plasticizer is contained in a large amount, it is preferable that the oil absorption amount is 150 ml/100 g or more since when a polyolefin resin, the inorganic particle and the plasticizer are melt-kneaded and extruded into a sheet form, an aggregated material is hardly generated, and a stretching with high draw ratio is possible, and high puncture strength and a thin membrane can be achieved. Further, in the case of using as a separator for a nonaqueous battery, since impregnation property and liquid retention property of a nonaqueous electrolyte are excellent, battery productivity and performance retention in a long-term use are expected. Further, the oil absorption amount of 1000 ml/100 g or less is preferable since a balk density of the inorganic particle is large, handling at production is easy.

A ratio of a polyolefin resin, an inorganic particle and a plasticizer that are used may be a ratio capable of uniform melt-kneading, may be a ratio sufficient for allowing to mold into a sheet form microporous membrane precursor, and may be in a degree of not damaging productivity. Specifically, a mass fraction of the plasticizer occupied in 100% by mass of a composition made of the polyolefin resin, inorganic particle and plasticizer is preferably 30 to 80% by mass, more preferably 40 to 70% by mass. The case where a mass fraction of the plasticizer is 80% by mass or less is preferable since melt tension in melt-molding is hardly insufficient, and moldability tends to be increased. On the other hand, the case where the mass fraction is 30% by mass or more is preferable since a membrane becomes thin in the thickness direction along with increase in a draw ratio, and it is possible to obtain a thin membrane. Further, since a plasticizing effect is sufficient, a crystalline, folded lamellar crystal can be stretched efficiently. By stretching with high draw ratio, cutting of a polyolefin chain does not occur, a uniform and fine porous structure is obtained, strength is easily increased, and a microporous membrane with a high crystallization degree is likely to be obtained. Having a high crystallization degree means having a large heat absorption amount by melting of a crystal, and for example, when used as a separator for a nonaqueous electrolyte battery, there is an effect of absorbing heat generation due to small short circuit, etc. A melting calorie is preferably 50 J/g or more, more preferably 80 J/g or more, and further more preferably 120 J/g or more. Separation between polyolefin and an inorganic particle is hardly generated, and a membrane has a structure in which all or a part of the inorganic particles is easily fused with the polyolefin itself, and thus, compression resistance performance in a local and minute area is excellent. Further, an extrusion load is reduced, and productivity is improved.

A method for melt-kneading a polyolefin resin, an inorganic particle and a plasticizer is preferably a method of obtaining a uniform solution by charging the polyolefin resin and the inorganic particle into a resin kneading device such as an extruder or a kneader, introducing the plasticizer at any ratio while heating and melting the resin, and further kneading a composition made of the resin, inorganic particle and plasticizer. As a further preferable method, an example includes a method of undergoing a step of preliminary kneading a polyolefin resin, an inorganic particle and a plasticizer in advance at a predetermined ratio using a henshell mixer, or the like, charging the kneaded material into an extruder, introducing the plasticizer at any ratio while melting by heating, and further kneading the mixture. Specifically, a kneaded article obtained by preliminarily kneading the polyolefin resin and the inorganic particle, and the plasticizer specified in the following range by a henshell mixer etc. is charged in a twin screw extruder, and the residual of the predetermined amount of the plasticizer is side-fed, which thereby allows to obtain a sheet with more preferable dispersibility of the organic particle, and thus stretching with high draw ratio can be carried out without breaking a membrane.

Specifically, it is preferable that the polyolefin resin, inorganic particle and plasticizer are preliminary kneaded within the range shown in the formula (I).

$$0.6 \leq (\text{weight of plasticizer})/((\text{plasticizer oil absorption amount}) \times (\text{weight of inorganic particle}) \times (\text{plasticizer density})) \times 100 \leq 1.2 \quad (1)$$

In the case of 0.6 or more, it is preferable since the inorganic particle retains the plasticizer appropriately and a gap of a bulk density with the polyolefin resin becomes small, and thus the inorganic particle is uniformly dispersed. In the case of 1.2 or less, it is preferable since aggregation of the inorganic particles due to kneading the inorganic particles in a large amount of the plasticizer can be prevented. It is more preferable to be 0.7 or more and 1.0 or less. When a ratio of the kneaded article that is finally added is within the above described range, if the polyolefin resin, inorganic particle and plasticizer are even kneaded at once using an extruder etc., a sheet with preferable dispersibility is suitably obtained.

Further, in order to obtain a microporous membrane forming a membrane structure in the state of fusing all or a part of inorganic particles with a polyolefin resin, a particle diameter of the inorganic particle is preferably 1 nm or more and less than 100 nm. In order to obtain these dispersed fine inorganic particles, it is preferable to increase shear strength or a torque, and also preferable to increase a molecular weight, raise a screw rotation speed, and preliminarily knead inorganic particles and a polyolefin composition at a high polymer concentration adding a small amount of a plasticizer.

A step of producing a microporous membrane precursor by transferring a molten material in the step (2), molding into a sheet form, and solidifying by cooling is preferably carried out by extruding a uniform solution of the polyolefin resin, inorganic particles and plasticizer into a sheet form through a T-die etc., and cooling to a sufficiently low temperature from a crystallization temperature of the resin by being in contact with a thermal conductor.

It is necessary that a temperature until a molten material is molded into a sheet form from transferring is set at a temperature higher than a setting temperature in the melt-kneading step. The temperature until molding into a sheet form from a transferring part is preferably +5° C. or more of the setting temperature in the melt-kneading step, and more preferably +10° C. or more of the setting temperature in the melt-kneading step. For example, in the case of continuously producing a membrane by an extruder, it is important that a pathway from an extruder exit to a T-die and a T-die are set at a higher temperature than a setting temperature of the extruder. An upper limit of the setting temperature until the step of molding into a sheet form after the melt-kneading step is preferably 300° C. or less, and more preferably 260° C. or less from the viewpoint of heat deterioration of a polyolefin resin. When the setting temperature until the step of molding into a sheet form after the melt-kneading step is set higher than the setting temperature in the extrusion step, it is preferable since a molten material can be molded into a sheet form without re-aggregation of the inorganic particles finely dispersed in the melt-kneading step. In particular, in the case of using an inorganic particle having a small particle diameter etc., an effect of suppressing aggregation is large. The ability to suppress aggregation of the inorganic particles etc. is preferable not only because stable thickness control is possible by being able to stably control a resin pressure, but also because improvement in a thickness retention ratio due to penetration creep and heat resistance can be expected.

As a thermal conductor used for solidification by cooling, a metal, water, air, or a plasticizer itself etc. can be used, and in particular, a method for cooling by allowing to be in contact with a metallic roll is preferable since efficiency of heat conduction is the highest. When allowing to be in contact with a metallic roll, pinching between the rolls is more preferable since efficiency of heat conduction is further enhanced, a sheet is oriented to increase a membrane thickness, and surface smoothness of a sheet is also increased. A die-lip interval when extruded into a sheet form by a T-die is preferably from 400 μm or more and 3,000 μm or less, and more preferably from 500 μm or more and 2,500 μm or less. It is preferable that the die-lip interval is 400 μm or more, since a resin-like attachment, and the like are reduced, influence to membrane quality such as streak and defects is less, and membrane rupture etc. can be prevented in a stretching step thereafter. It is preferable that the die-lip interval is 3000 μm or less, since thickness stability can be maintained in addition that a cooling speed is fast and cooling unevenness can be prevented.

Then, in a stretching step (3), a stretching direction is at least uniaxial stretching. In the case of stretching with high draw ratio in a biaxial direction, because of molecular orientation in a surface direction, a sheet is hardly torn so as to have a stable structure, and thus high puncture strength can be obtained. A stretching method may employ any method of simultaneous biaxial stretching, sequential biaxial stretching, multistage stretching, large number stretching, and the like, alone or in combination, but it is most preferable that the stretching method is simultaneous biaxial stretching from the viewpoints of increase in puncture strength and uniformity of a membrane thickness. Simultaneous biaxial stretching referred herein is a technique of performing stretching in the MD direction and stretching in the TD direction at the same time, and a deformation rate of each direction may be different. Sequential biaxial stretching is a technique of independently performing stretching in the MD direction or the TD direction, and in stretching in the MD direction or the TD direction, the other direction is in a state of nonbinding or a state of being fixed with a specified length. A draw ratio is within the range from 20 times or more to less than 200 times as a surface stretching ratio, preferably within the range from 20 times or more to 100 times or less, and more preferably within the range from 25 times or more to 50 times or less.

A draw ratio in each axial direction is preferably within the range from 4 times or more to 10 times or less in the MD direction and within the range from 4 times or more to 10 times or less in the TD direction, and more preferably within the range from 5 times or more to 8 times or less in the MD direction and within the range from 5 times or more to 8 times or less in the TD direction. It is preferable that when a total surface stretching ratio is 20 times or more, sufficient puncture strength can be given to a membrane, and when less than 200 times, membrane rupture is prevented and high productivity can be obtained. In the case of stretching by 4 times or more in the MD direction and by 4 times or more in the TD direction, it is preferable since a product with small unevenness both in the MD direction and the TD direction can be easily obtained. When the draw ratio is 10 times or less, rolled-up property is excellent. In particular, in the case of using as a separator for a large lithium ion secondary battery such as a hybrid automobile, since a battery size is large, a separator width and a roll length which are used per one battery are long, and desire of a uniform membrane thickness is intense.

When a plurality of stretchings are used in combination before and after extracting a plasticizer, a draw ratio after extraction of a plasticizer is at least preferably less than 4 times as a surface stretching ratio, and more preferably less than 3 times. It is preferable that the surface stretching ratio is less than 4 times since generation of macro void and decrease in puncture strength can be suppressed.

If the draw ratio is within the range not lowering shutdown property, a rolling step may be used in combination with a biaxial stretching step. Rolling can be carried out by a press method using a double belt pressing machine, or the like. Rolling particularly enables orientation of a surface layer part to increase. A rolling surface stretching ratio is preferably from 1.01 times or more to 3 times or less, and more preferably from 1.01 times or more to 2 times or less. The rolling surface stretching ratio of 1.01 times or more is preferable since surface orientation is increased and puncture strength is enhanced. The rolling surface stretching ratio of 3 times or less is preferable since a orientation difference between a surface layer part and central interior part is small and a uniform porous structure is exhibited in the surface layer part and interior part in the stretching step. Further, it is preferable in view of industrial production.

A stretching temperature is preferably a melting temperature of polyolefin −50° C. or more and less than the melting temperature, and more preferably a melting temperature of polyolefin −30° C. or more and the melting temperature −2° C. or less, and further more preferably a melting temperature of polyolefin −15° C. or more and the melting temperature −30° C. or less. The stretching temperature of the melting temperature of polyolefin −50° C. or more is preferable since boundary separation between polyolefin and an inorganic particle or between polyolefin and a plasticizer is hardly generated, and compression resistance in a local and minute area is excellent. The stretching temperature is preferably less than a melting temperature of polyolefin resin since high puncture strength is easily obtained, and further, stretching unevenness can be reduced. For example, when high density polyethylene is used, 120° C. or more and 132° C. or less is preferable. When a plurality of polyolefins are used in mixture, the melting temperature may be on the basis of a melting temperature of polyolefin having a larger melting calorie.

It is necessary to perform the step of extracting a plasticizer (4) after the stretching step (3) from the viewpoint of high puncture strength.

A method for extracting a plasticizer may be any of a batch type and a continuous type, and it is preferable that a plasticizer is extracted by impregnating a microporous membrane into an extraction solvent and sufficiently dried, and the plasticizer is substantially removed from the microporous membrane. In order to suppress shrinkage of the microporous membrane, binding an end part of the microporous membrane during the serial steps of impregnation and drying is preferable. Further, a residual amount of the plasticizer in the microporous membrane after extraction is preferably less than 1% by mass.

It is desirable that the extraction solvent is a poor solvent for a polyolefin resin and an inorganic particle and a good solvent for a plasticizer, and the boiling point is lower than a melting point of a polyolefin microporous membrane. Examples of such an extraction solvent include hydrocarbons such as n-hexane and cyclohexene, halogenated hydrocarbons such as methylene chloride and 1,1,1-trichloroethane, non-chlorine type halogenating solvents such as hydrofloroether and hydroflorocarbon, alcohols such as ethanol and isopropanol, ethers such as diethyl ether and tetrahydrofuran, and ketones such as acetone and methyl ethyl ketone.

In the microporous membrane of the present invention, it is preferable to add heat treatment steps such as heat fixation and heat relaxation successively or after each stretching process within the range not damaging advantages of the present invention because of an effect of further suppressing shrinkage of the microporous membrane.

Further, a post treatment may be carried out within the range not damaging advantages of the present invention. Examples of the post treatment include a hydrophilic treatment by a surfactant, and the like, and a crosslinking treatment by ionizing radiation.

The polyolefin microporous membrane of the present invention is useful as a separator for a battery, in particular, for a nonaqueous electrolyte battery.

A battery obtained by using the polyolefin microporous membrane of the present invention is a lithium ion secondary battery using the polyolefin microporous membrane as a separator. Such a battery can be produced through a step of obtaining a separator in a vertically long shape with a width of the microporous membrane of 10 to 500 mm, preferably 80 to 500 mm, and a length of 200 to 4000 m, preferably 1000 to 4000 m, a step of obtaining a rolled-up product by overlapping this separator in order of cathode-separator-anode-separator or anode-separator-cathode-separator and rolling around in circular or flat whorls, and a step of housing the rolled-up product in a battery can further injecting an electrolyte therein. A battery obtained by using the polyolefin microporous membrane of the present invention is excellent in safety and long-term reliability, and thus is particularly useful as an electric automobile and a hybrid automobile.

EXAMPLES

Then, the present invention will be more specifically described with reference to Examples, however these Examples are not intended to limit the scope of the present invention. Test methods in Examples are as follows.

<Evaluation of Microporous Membrane>
(1) Membrane Thickness

A membrane thickness was measured at room temperature of 23° C. using a micro thickness meter (Type KBM, made by Toyo Seiki Seisaku-sho, Ltd.).

(2) Porosity

A 10 cm×10 cm square sample was cut out from a microporous membrane, and the volume ($cm^3$) and mass (g) thereof were found to calculate a porosity from the volume and the mass and a membrane density ($g/cm^3$) by using the following formula.

Porosity (%)=(Volume−Mass/(Mixture composition density))/Volume×100

In addition, for the density of a mixture composition, a value found by calculation from each density of a polyolefin resin and inorganic particles that are used and a mixing ratio was used.

(3) Air Permeability

An air permeability was measured by a Gurley type air permeability meter (made by Toyo Seiki Seisaku-sho, Ltd.) in accordance with JIS P-8117.

(4) Puncture Strength

A puncture test was performed under the conditions of a curvature radius of a tip of a needle of 0.5 mm and a puncture speed of 2 mm/sec, using a KES-G5 handy compression tester (trademark) made by KATO TECH CO., LTD., and a maximum puncture load was defined as a puncture strength (N).

(5) Penetration Creep

A penetration creep was measured by a constant pressure thickness meter "PEACOCK FFA-1" (trademark, made by OZAKI MFG. CO., LTD.) using a needle-like probe (TX-4, made by OZAKI MFG. CO., LTD.) with a tip of 0.1 mmφ. In the state of continuously giving a load of a measuring force of 1.25 N, assuming that a thickness after 1 hour is $d_{[1h]}$, a thickness after 24 hours is $d_{[24h]}$, and a membrane thickness before the measurement is D, a thickness retention ratio and a membrane thickness reduction rate were calculated by using the following formula. Arbitrary five points were selected to perform the measurement, and an average value thereof was defined as a characteristic value. The membrane thickness retention ratio shows a membrane thickness retention ratio after 24 hours from the start of the measurement. The membrane thickness reduction rate shows a membrane thickness reduction rate after 24 hours from 1 hour after the start of the measurement (time is converted by common logarithm). In the penetration creep evaluation, when a common logarithm was used for a time axis (log [time]), the membrane thickness retention ratio generally linearly decreased, and thus, the gradient (reduction rate) was defined as a membrane thickness reduction rate.

Membrane thickness retention ratio (%)=$d_{[24h]}/D \times 100$

Membrane thickness reduction rate (%)= $(d_{[1h]}-d_{[24h]})/D \times 100/\log_{10} 24$ (6) Viscosity Average Molecular Weight (Mv)

In order to prevent deterioration of a sample, 2,6-di-t-butyl-4-methylphenol was dissolved in decahydronaphthalene so as to have a concentration of 0.1 w %, and this solution (hereinafter, abbreviated as DHN) was used as a sample solvent.

The sample was dissolved in DHN at 150° C. so as to have a concentration of 0.1 w % to prepare a sample solution. 10 ml of the prepared sample solution was collected, and the number of seconds (t) passing between marked lines was measured at 135° C. by a Cannon-fenske viscometer (SO100). When the inorganic particles were contained in the microporous membrane, a solution obtained by dissolving the microporous membrane in DHN was filtered, and the sample was collected after removing the inorganic particles. In addition, when the inorganic particles can be resolved and removed, a microporous membrane in which inorganic particles are removed in advance may be used. Further, after heating. DHN at 150° C., 10 ml was collected and the number of seconds ($t_B$) passing between marked lines was measured by the same method. Using the numbers of passing seconds t and $t_B$, an ultimate viscosity [η] was calculated by the following conversion equation.

$$[\eta]=((1.651t/t_B 0.651)^{0.5}-1)/0.0834$$

Mv was calculated by the following formula from [η] that was found.

$$[\eta]=6.77\times 10^{-4}\, Mv^{0.67}$$

(7) Bubble Point (MPa)

A bubble point was calculated in an ethanol in accordance with ASTM E-128-61.

(8) Porosity Diameter Ratio

A porosity diameter ratio of a microporous membrane is represented by (surface porosity diameter)/(cross-section porosity ratio). For the surface porosity diameter of the microporous membrane, a long diameter and a short diameter of pores present per 5 cm×5 cm of a scanning electron micrograph at 25,000 magnification of a surface are counted and the surface porosity diameter is calculated from the average value thereof. For the cross-section porosity diameter, only a long diameter of pores present per 5 cm×5 cm of a scanning electron micrograph at 5,000 magnification of a surface is counted and the cross-section porosity diameter is calculated from the average value thereof.

(9) Shutdown temperature a. Cathode

A slurry is prepared by dispersing 92.2% by mass of a lithium cobalt complex oxide ($LiCoO_2$) as a cathode active material, respectively 2.3% by mass of scale-like graphite and acetylene black as conductors, and 3.2% by mass of polyvinylidene fluoride (PVDF) as a binder into N-methyl-pyrrolidone (NMP). This slurry is coated on one surface of an aluminum foil with a thickness of 20 μm that is a cathode collector by a die coater and dried at 130° C. for 3 minutes, and then subjected to compression molding by a roll pressing machine. In this time, a coating amount of the cathode active material is adjusted at 250 g/m², and a bulk density of the active material is adjusted at 3.00 g/cm³.

b. Anode

A slurry is prepared by dissolving 96.6% by mass of artificial graphite as an anode active material, 1.4% by mass of an ammonium salt of carboxymethylcellulose as a binder and 1.7% by mass of a styrene-butadiene copolymer latex in a refined water. This slurry was coated on one surface of a copper foil with a thickness of 12 μm that is an anode collector by a die coater and dried at 120° C. for 3 minutes, and then subjected to compression molding by a roll pressing machine. In this time, a coating amount of the anode active material is adjusted at 106 g/m², and a bulk density of the active material is adjusted at 1.35 g/cm³.

c. Nonaqueous Electrolyte

A nonaqueous electrolyte is prepared by dissolving $LiBF_4$ as a solute in a mixed solvent of propylene carbonate: ethylene carbonate:γ-butyllactone=1:1:2 (volume ratio) so as to have a concentration of 1.0 mol/L.

d. Evaluation

On a ceramics plate connecting an electrothermal pair, an anode cut out into 65 mm×20 mm and impregnated in a nonaqueous electrolyte for 1 minute or more is placed, an aramid film with a thickness of 9 μm having a hole with a diameter of 16 mm on the center, which is cut out into 50 mm×50 mm, is placed thereon, a microporous membrane of a sample cut out into 40 mm×40 mm and impregnated into the nonaqueous electrolyte for 1 hour or more was placed thereon so as to cover the hole of the aramid film, a cathode cut out into 65 mm×20 mm and impregnated into the nonaqueous electrolyte for 1 hour or more was placed without being in contact with the anode, a capton film is placed thereon, and further, a silicon rubber with a thickness of about 4 mm is placed thereon.

After setting the resultant plate on a hot plate, the temperature was increased at a speed of 15° C./min to 160° C. in a state of applying a pressure of 4.1 MPa by a oil pressure pressing machine, an impedance change between the cathode and the anode in this time was measured under the conditions of an alternate current of 1 V and 1 kHz. In this measurement, a temperature at the time of reaching the impedance of 1000Ω was defined as a shutdown temperature.

(10) Evaluation of Heat Resistance a. Cathode

A cathode that is the same as the cathode used in measuring the shutdown temperature was used.

b. Anode

A cathode that is the same as the cathode used in measuring the shutdown temperature was used.

c. Cell Preparation

A cathode of 75 mm×25 mm, an anode of 75 mm×25 mm, a microporous membrane of 50 mm×50 mm, and a PET film of 75 mm×75 mm were cut out. Using a SUS plate of 70 mm×70 mm and a double clip (made by KOKUYO Co., Ltd., specification: small, mouth width of 19 mm), the SUS plate, PET film, anode, microporous membrane, cathode, PET film and SUS plate were sequentially laminated, thereafter pinching four corners by the double clips so as to fix. The cathode and the anode were placed so that active material faces of the cathode and the anode were faced with each other, the cathode and the anode were intersected with each other, and one edge of each of the cathode and the anode was run off from the PET film. The microporous membrane was disposed on a part to which the cathode and the anode were overlapped, and the cathode and the anode were overlapped so that they were not directly contact with each other. Using a tester (HIOKI3560 AC Milliohm HiTester, made by HIOKI E.E. CORPORATION.), the cathode and the anode that were run off from the PET film were connected to a terminal, and a resistance value between the cathode and the anode was measured and confirmed to be $10^6$Ω or more. A view of cell external appearance is shown in FIGS. 2 and 3.

d-1. Evaluation (1)

A cell was placed still in an oven set at a predetermined temperature, taken out after the predetermined time and sufficiently cooled, and then, a resistance between the cathode and the anode was measured. A resistance value of 1000Ω or more was determined as acceptance (O), and a resistance value of less than 1000Ω was determined as nonacceptance (x). The measurement was carried out under the following two conditions.

Evaluation condition 1: oven temperature at 180° C., and heating time for 30 minutes
Evaluation condition 2: oven temperature at 200° C., and heating time for 10 minutes
d-2. Evaluation (2)

For the cells obtained in the abode described a. to c., the cell was heated in the state of pressurization without fixing with double clips, using a pressing machine (MINI TEST PRESS10, cylinder area of 3318 mm$^2$, made by Toyo Seiki Seisaku-sho, Ltd.). The cell was taken out after the predetermined time, and sufficiently cooled, and then, a resistance between the cathode and the anode was measured. A resistance value of 1000Ω or more was determined as acceptance (O), and a resistance value of less than 1000Ω was determined as nonacceptance (x). The measurement was carried out under the following conditions.
Evaluation condition 3: Pressing machine gage pressure at 5 MPa, pressing machine temperature at 200° C., and heating time for 10 minutes

(11) Melting Point and Melting Calorie

The measurement was carried out by using DSC 60 made by Shimadzu Corporation. A porous membrane was punched out in a circular shape with a diameter of 5 mm, several sheets were laminated to have a weight of 3 mg and used as a measurement sample. This sample was spread over an open sample pan made of aluminum with a diameter of 5 mm, and a cramping cover was placed thereon, and fixed in the aluminum pan with a sample sealer. The measurement was performed from 30° C. to 200° C. at a temperature increase rate of 10° C./min under a nitrogen atmosphere to obtain a melting endothermic curve. The peak top temperature of the obtained melting endothermic curve was defined as a melting point (° C.) and a melting calorie (J/g) was calculated from its peak area.

Example 1

18 parts by mass of high density polyethylene "SH800" (trademark, made by Asahi Kasei Chemicals Corporation) having a viscosity average molecular weight (Mv) of 270,000, 12 parts by mass of an ultra-high molecular weight polyethylene "UH850" (trademark, made by Asahi Kasei Chemicals Corporation) having Mv of 2,000,000, 20 parts by mass of silica "DM10C" (trademark, made by TOKUYAMA Corporation, hydrophobic treatment was carried out with dimethyldichlorosilane) having an average primary particle diameter of 15 nm, 30 parts by mass of a liquid paraffin "SMOIL P-350P" (trademark, made by Matsumura Oil Research Corp.) as a plasticizer, and 0.3 part by mass of pentaerythrityl-tetrakis-[3-(3,5-di-t-butyl-4-hydroxyphenyl)propionate] as an antioxidant were added and preliminarily mixed by a super mixer. The resultant mixture was fed into a feeding inlet of a twin screw extruder in which two screws rotate in the same direction by a feeder. Further, the liquid paraffin was side-fed into a cylinder of the twin screw extruder so that an amount ratio of the liquid paraffin in the whole mixture (100 parts by mass) that was melt-kneaded and extruded was 50 parts by mass. Melt-kneading by the extruder was carried out under the conditions of a setting temperature of 200° C., a screw rotation speed of 180 rpm, and a discharge amount of 12 kg/h. Subsequently, the melt-kneaded article was extruded between cooling rolls controlled at a surface temperature of 25° C., through a gear pump, a conducting tube and a T-die, which were respectively set at a temperature of 220° C., and a sheet-form polyolefin composition with a thickness of 1200 μm was obtained. Then, the sheet-form polyolefin composition was led to a simultaneous biaxial tenter and subjected to simultaneous biaxial stretching by 7 times in a longitudinal direction and 7 times in a lateral direction. A setting temperature of this simultaneous biaxial tenter was 123° C. Then, leading to a methylene chloride vessel, the resultant sheet-form polyolefin composition was sufficiently immersed in methylene chloride and the liquid paraffin was extracted and removed. Methylene chloride was then dried. Further, leading to the lateral tenter to stretch by 1.4 times in the lateral direction, thereafter relaxing so as to be 1.2 times at a final exit, and the sheet-form polyolefin composition was wound up. A setting temperature of a lateral stretching part was 132° C., and a setting temperature of an relaxing part was 137° C. Membrane preparation conditions and membrane characteristics are shown in Table 1.

Example 2

A microporous membrane was obtained in the same manner as in Example 1 except for using 9 parts by mass of the high density polyethylene having Mv of 270,000, 13.5 parts by mass of the ultra-high molecular weight polyethylene having Mv of 2,000,000, 27.5 parts by mass of the silica "DM10C" (trademark, made by TOKUYAMA Corporation, hydrophobic treatment was carried out with dimethyldichlorosilane) having an average primary particle diameter of 15 nm, and 40 parts by mass of the liquid paraffin in Example 1 and preliminarily mixing by a super mixer. Membrane preparation conditions and membrane characteristics are shown in Table 1.

Example 3

A microporous membrane was obtained in the same manner as in Example 1 except for using 24 parts by mass of the high density polyethylene having Mv of 270,000, 16 parts by mass of the ultra-high molecular weight polyethylene having Mv of 2,000,000, 10 parts by mass of the silica "DM10C" (trademark, made by TOKUYAMA Corporation, hydrophobic treatment was carried out with dimethyldichlorosilane) having an average primary particle diameter of 15 nm, and 20 parts by mass of the liquid paraffin and preliminarily mixing by a super mixer, and changing a setting temperature of lateral stretching to 125° C. and a setting temperature in an relaxing part to 130° C. Membrane preparation conditions and membrane characteristics are shown in Table 1.

Example 4

A microporous membrane was obtained in the same manner as in Example 1 except for changing the polyethylene in Example 1 to 30 parts by mass of the high density polyethylene having Mv of 270,000 and changing a setting temperature of lateral stretching to 128° C. and a setting temperature in an relaxing part to 133° C. Membrane preparation conditions and membrane characteristics are shown in Table 1.

Example 5

A microporous membrane was obtained in the same manner as in Example 1 except for changing the polyethylene in Example 3 to 40 parts by mass of the high density polyethylene having Mv of 270,000 and changing a setting temperature of lateral stretching to 125° C. and a setting temperature in an relaxing part to 130° C. Membrane preparation conditions and membrane characteristics are shown in Table 1.

Example 6

A microporous membrane was obtained in the same manner as in Example 1 except for changing the silica in Example 1 to silica "HM-20L" (trademark, made by TOKUYAMA Corporation, hydrophobic treatment was carried out with hexamethylenedisilane) having an average primary particle diameter of 12 nm. Membrane preparation conditions and membrane characteristics are shown in Table 2.

Example 7

A microporous membrane was obtained in the same manner as in Example 1 except for changing the silica in Example 1 to 1.5 parts by mass of silica "QS10" (trademark, made by TOKUYAMA Corporation, no hydrophobic treatment was carried out) having an average primary particle diameter of 15 nm and 18.5 parts by mass of silica "HM-20L" (trademark, made by TOKUYAMA Corporation, hydrophobic treatment was carried out with hexamethylenedisilane) having an average primary particle diameter of 12 nm, and changing ratios of simultaneous biaxial stretching in the longitudinal direction to 10 times and in the lateral direction to 10 times. Membrane preparation conditions and membrane characteristics are shown in Table 2.

Example 8

A microporous membrane was obtained in the same manner as in Example 1 except for changing the silica in Example 1 to alumina "AluC" (trademark, made by Degussa Co., no hydrophobic treatment was carried out) having an average primary particle diameter of 13 nm. Membrane preparation conditions and membrane characteristics are shown in Table 2.

Example 9

A microporous membrane was obtained in the same manner as in Example 2 except for changing the silica in Example 2 to alumina "AluC" (trademark, made by Degussa Co., no hydrophobic treatment was carried out) having an average primary particle diameter of 13 nm. Membrane preparation conditions and membrane characteristics are shown in Table 2.

Example 10

A microporous membrane was obtained in the same manner as in Example 1 except for changing the silica in Example 1 to calcium carbonate "Hakuenka O" (trademark, Shiraishi Kogyo Kaisha, Ltd., hydrophobic treatment was carried out with rosin acid) having an average primary particle diameter of 30 nm. Membrane preparation conditions and membrane characteristics are shown in Table 2.

Example 11

14 parts by mass of high density polyethylene "SH800" (trademark, made by Asahi Kasei Chemicals Corporation) having a viscosity average molecular weight (Mv) of 270,000, 10 parts by mass of an ultra-high molecular weight polyethylene "UH850" (trademark, made by Asahi Kasei Chemicals Corporation) having Mv of 2,000,000, 6 parts by mass of homopolypropylene "H-100M" (made by Prime Polymer Co., Ltd.) having Mv of 400,000, 20 parts by mass of alumina "AluC" (trademark, made by Degussa Co., no hydrophobic treatment was carried out) having an average primary particle diameter of 13 nm, 30 parts by mass of a liquid paraffin "SMOIL P-350P" (trademark, made by Matsumura Oil Research Corp.) as a plasticizer, and 0.3 part by mass of pentaerythrityl-tetrakis-[3-(3,5-di-t-butyl-4-hydroxyphenyl)propionate] as an antioxidant were added and preliminarily mixed by a super mixer. The resultant mixture was fed into a feeding inlet of a twin screw extruder in which two screws rotate in the same direction by a feeder. Further, the liquid paraffin was side-fed into a cylinder of the twin screw extruder so that an amount ratio of the liquid paraffin in the whole mixture (100 parts by mass) that was melt-kneaded and extruded was 50 parts by mass. Melt-kneading by the extruder was carried out under the conditions of a setting temperature of 200° C., a screw rotation speed of 180 rpm, and a discharge amount of 12 kg/h. Subsequently, the melt-kneaded article was extruded between cooling rolls controlled at a surface temperature of 25° C., through a gear pump, a conducting tube and a T-die, which were respectively set at a temperature of 220° C., and a sheet-form polyolefin composition with a thickness of 1200 μm was obtained. Then, the sheet-form polyolefin composition was led to a simultaneous biaxial tenter and subjected to simultaneous biaxial stretching by 7 times in a longitudinal direction and 7 times in a lateral direction. A setting temperature of this simultaneous biaxial tenter was 123° C. Then, leading to a methylene chloride vessel, the resultant sheet-form polyolefin composition was sufficiently immersed in methylene chloride and the liquid paraffin was extracted and removed. Methylene chloride was then dried. Further, leading to the lateral tenter to stretch by 1.4 times in the lateral direction, thereafter relaxing so as to be 1.2 times at a final exit, and the sheet-form polyolefin composition was wound up. A setting temperature of a lateral stretching part was 132° C., and a setting temperature of an relaxing part was 137° C. Membrane preparation conditions and membrane characteristics are shown in Table 3.

Example 12

A microporous membrane was obtained in the same manner as in Example 11 except for changing to 10.8 parts by mass of high density polyethylene "SH800" (trademark, made by Asahi Kasei Chemicals Corporation) having a viscosity average molecular weight (Mv) of 270,000, 7.2 parts by mass of an ultra-high molecular weight polyethylene "UH850" (trademark, made by Asahi Kasei Chemicals Corporation) having Mv of 2,000,000, 4.5 parts by mass of homopolypropylene "H-100M" (made by Prime Polymer Co., Ltd.) having Mv of 400,000, 27.5 parts by mass of alumina "AluC" (trademark, made by Degussa Co., no hydrophobic treatment was carried out) having an average primary particle diameter of 13 nm, 40 parts by mass of a liquid paraffin "SMOIL P-350P" (trademark, made by Matsumura Oil Research Corp.) as a plasticizer. Membrane preparation conditions and membrane characteristics are shown in Table 3.

Example 13

A microporous membrane was obtained in the same manner as in Example 12 except for changing to 12.6 parts by mass of high density polyethylene "SH800" (trademark, made by Asahi Kasei Chemicals Corporation) having a viscosity average molecular weight (Mv) of 270,000, 8.4 parts by mass of an ultra-high molecular weight polyethylene "UH850" (trademark, made by Asahi Kasei Chemicals Corporation) having Mv of 2,000,000, and 1.5 parts by mass of homopolypropylene "H-100M" (made by Prime Polymer Co., Ltd.) having Mv of 400,000. Membrane preparation conditions and membrane characteristics are shown in Table 3.

Example 14

A microporous membrane was obtained in the same manner as in Example 11 except for changing to 20 parts by mass of silica "DM10C" (trademark, made by TOKUYAMA Corporation, hydrophobic treatment was carried out with dimethyldichlorosilane) having an average primary particle diameter of 15 nm in place of alumina used in Example 11. Membrane preparation conditions and membrane characteristics are shown in Table 3.

Example 15

A microporous membrane was obtained in the same manner as in Example 11 except for changing to 12.6 parts by mass of high density polyethylene "SH800" (trademark, made by Asahi Kasei Chemicals Corporation) having a viscosity average molecular weight (Mv) of 270,000, 8.4 parts by mass of an ultra-high molecular weight polyethylene "UH850" (trademark, made by Asahi Kasei Chemicals Corporation) having Mv of 2,000,000, and 9 parts by mass of homopolypropylene "H-100M" (made by Prime Polymer Co., Ltd.) having Mv of 400,000, and changing to 20 parts by mass of silica "DM10C" (trademark, made by TOKUYAMA Corporation, hydrophobic treatment was carried out with dimethyldichlorosilane) having an average primary particle diameter of 15 nm in place of alumina used in Example 11. Membrane preparation conditions and membrane characteristics are shown in Table 3.

Example 16

A microporous membrane was obtained in the same manner as in Example 11 except for changing to 20 parts by mass of Titania "TTO-55S" (made by ISHIHARA SANGYO KAISHA, LTD., hydrophobic treatment was carried out with organosiloxane) having an average primary particle diameter of 50 nm in place of alumina used in Example 11. Membrane preparation conditions and membrane characteristics are shown in Table 3.

Comparative Example 1

22.8 parts by mass of high density polyethylene "SH800" (trademark, made by Asahi Kasei Chemicals Corporation) having a viscosity average molecular weight (Mv) of 270,000, 15.2 parts by mass of an ultra-high molecular weight polyethylene "UH850" (trademark, made by Asahi Kasei Chemicals Corporation) having Mv of 2,000,000, 2 parts by mass of silica "DM10C" (trademark, made by TOKUYAMA Corporation, hydrophobic treatment was carried out with dimethyldichlorosilane) having an average primary particle diameter of 15 nm, 4 parts by mass of a liquid paraffin "SMOIL P-350P" (trademark, made by Matsumura Oil Research Corp.) as a plasticizer, and 0.3 part by mass of pentaerythrityl-tetrakis-[3-(3,5-di-t-butyl-4-hydroxyphenyl) propionate] as an antioxidant were added and preliminarily mixed by a super mixer. The resultant mixture was fed into a feeding inlet of a twin screw extruder in which two screws rotate in the same direction by a feeder. Further, the liquid paraffin was side-fed into a cylinder of the twin screw extruder so that an amount ratio of the liquid paraffin in the whole mixture (100 parts by mass) that was melt-kneaded and extruded was 60 parts by mass. Melt-kneading by the extruder was carried out under the conditions of a setting temperature of 200° C., a screw rotation speed of 180 rpm, and a discharge amount of 12 kg/h. Subsequently, the melt-kneaded article was extruded between cooling rolls controlled at a surface temperature of 25° C., through a gear pump, a conducting tube and a T-die, which were respectively set at a temperature of 220° C., and a sheet-form polyolefin composition with a thickness of 1200 μm was obtained. Then, the sheet-form polyolefin composition was led to a simultaneous biaxial tenter and subjected to simultaneous biaxial stretching by 7 times in a longitudinal direction and 7 times in a lateral direction. A setting temperature of this simultaneous biaxial tenter was 122° C. Then, leading to a methylene chloride vessel, the resultant sheet-form polyolefin composition was sufficiently immersed in methylene chloride and the liquid paraffin was extracted and removed. Methylene chloride was then dried. Further, leading to the lateral tenter to stretch by 1.4 times in the lateral direction, thereafter relaxing so as to be 1.2 times at a final exit, and the sheet-form polyolefin composition was wound up. A setting temperature of a lateral stretching part was 125° C., and a setting temperature of an relaxing part was 130° C. Membrane preparation conditions and membrane characteristics are shown in Table 4.

Comparative Example 2

45 parts by mass of high density polyethylene "SH800" (trademark, made by Asahi Kasei Chemicals Corporation) having a viscosity average molecular weight (Mv) of 270,000, and 0.3 part by mass of pentaerythrityl-tetrakis-[3-(3,5-di-t-butyl-4-hydroxyphenyl)propionate] as an antioxidant were added and preliminarily mixed by a henschel mixer. The resultant mixture was fed into a feeding inlet of a twin screw extruder in which two screws rotate in the same direction by a feeder. Further, a liquid paraffin "SMOIL P-350P" (trademark, made by Matsumura Oil Research Corp.) was side-fed into a cylinder of the twin screw extruder so that an amount ratio of the liquid paraffin in the whole mixture (100 parts by mass) that was melt-kneaded and extruded was 55 parts by mass. Melt-kneading by the extruder was carried out under the conditions of a setting temperature of 200° C., a screw rotation speed of 180 rpm, and a discharge amount of 12 kg/h. Subsequently, the melt-kneaded article was extruded between cooling rolls controlled at a surface temperature of 25° C., through a gear pump, a conducting tube and a T-die, which were respectively set at a temperature of 220° C., and a sheet-form polyolefin composition with a thickness of 1200 μm was obtained. Then, the sheet-form polyolefin composition was led to a simultaneous biaxial tenter and subjected to simultaneous biaxial stretching by 7 times in a longitudinal direction and 7 times in a lateral direction. A setting temperature of this simultaneous biaxial tenter was 124° C. Then, leading to a methylene chloride vessel, the resultant sheet-form polyolefin composition was sufficiently immersed in methylene chloride and the liquid paraffin was extracted and removed. Methylene chloride was then dried. Further, leading to the lateral tenter to stretch by 1.4 times in the lateral direction, thereafter relaxing so as to be 1.2 times at a final exit, and the sheet-form polyolefin composition was wound up. A setting temperature of a lateral stretching part was 125° C., and a setting temperature of an relaxing part was 130° C. Membrane preparation conditions and membrane characteristics are shown in Table 4.

Comparative Example 3

A microporous membrane was obtained in the same manner as in Example 1 except for changing the silica in Example 1 to alumina "A33F" (trademark, made by Nippon Light Metal Company, Ltd., no hydrophobic treatment was carried out) having an average primary particle diameter of 700 nm. Membrane preparation conditions and membrane characteristics are shown in Table 4.

Comparative Example 4

38 parts by mass of high density polyethylene "SH800" (trademark, made by Asahi Kasei Chemicals Corporation) having a viscosity average molecular weight (Mv) of 270,000, 60 parts by mass of a calcium carbonate "PC" (trademark, Shiraishi Kogyo Kaisha, Ltd., no hydrophobic treatment was carried out) having an average diameter of 1.5 µm, 2 parts by mass of a liquid paraffin "SMOIL P-350P" (trademark, made by Matsumura Oil Research Corp.) as a plasticizer and 0.3 part by mass of pentaerythrityl-tetrakis-[3-(3,5-di-t-butyl-4-hydroxyphenyl)propionate] as an antioxidant were added, and heated while mixing by using a plastomill made by Toyo Seiki Seisaku-sho, Ltd. Heating and mixing was carried out for 10 minutes, setting a setting temperature of the plastomill of 200° C. and a screw rotation speed of 50 rpm. The molten mixture was taken out from the plastomill and cooled, the solidified article was pinched between metal plates via a polyimide film, and compressed at 10 MPa using a heat pressing machine set at 200° C. to form a sheet with a thickness of 320 µm. The obtained sheet was subjected to simultaneous biaxial stretching by 5.5 times in the longitudinal direction and 5.5 times in the lateral direction by using a biaxial stretching machine made by Iwamoto Seisakusyo Co. at 135° C. Then, the plasticizer was removed in methylene chloride in the state of fixing at four corners with a stainless flame, thereafter drying at room temperature to obtain a microporous membrane. Membrane preparation conditions and membrane characteristics are shown in Table 4.

Comparative Example 5

18 parts by mass of high density polyethylene "SH800" (trademark, made by Asahi Kasei Chemicals Corporation) having a viscosity average molecular weight (Mv) of 270,000, 12 parts by mass of an ultra-high molecular weight polyethylene "UH850" (trademark, made by Asahi Kasei Chemicals Corporation) having Mv of 2,000,000, 10 parts by mass of silica "EXCELICA SE-5" (trademark, made by TOKUYAMA Corporation, no hydrophobic treatment was carried out) having an average primary particle diameter of 6 µm, 15 parts by mass of a liquid paraffin "SMOIL P-350P" (trademark, made by Matsumura Oil Research Corp.) as a plasticizer, and 0.3 part by mass of pentaerythrityl-tetrakis-[3-(3,5-di-t-butyl-4-hydroxyphenyl)propionate] as an antioxidant were added and preliminarily mixed by a henschel mixer. The resultant mixture was fed into a feeding inlet of a twin screw extruder in which two screws rotate in the same direction by a feeder. Further, a liquid paraffin "SMOIL P-350P" (trademark, made by Matsumura Oil Research Corp.) was side-fed into a cylinder of the twin screw extruder so that an amount ratio of the liquid paraffin in the whole mixture (100 parts by mass) that was melt-kneaded and extruded was 60 parts by mass. Melt-kneading by the extruder was carried out under the conditions of a setting temperature of 200° C., a screw rotation speed of 180 rpm, and a discharge amount of 12 kg/h. Subsequently, the melt-kneaded article was extruded between cooling rolls controlled at a surface temperature of 25° C., through a gear pump, a conducting tube and a T-die, which were respectively set at a temperature of 220° C., and a sheet-form polyolefin composition with a thickness of 1500 µm was obtained. Then, the sheet-form polyolefin composition was led to a simultaneous biaxial tenter and subjected to simultaneous biaxial stretching by 7 times in a longitudinal direction and 7 times in a lateral direction. A setting temperature of this simultaneous biaxial tenter was 125° C. Then, leading to a methylene chloride vessel, the resultant sheet-form polyolefin composition was sufficiently immersed in methylene chloride and the liquid paraffin was extracted and removed. Methylene chloride was then dried. Further, leading to the lateral tenter to stretch by 1.3 times in the TD direction, thereafter continuously performing thermal fixation, and the sheet was wound up. Setting temperatures of the lateral tenter were 131° C. in a stretching part and 136° C. in a thermal fixation part. Membrane preparation conditions and membrane characteristics are shown in Table 5.

Comparative Example 6

8 parts by mass of high density polyethylene "GUR2122" (trademark, made by Ticona) having a viscosity average molecular weight (Mv) of 2,680,000, 10 parts by mass of silica "Aerosil 200" (trademark, made by NIPPON AEROSIL CO., LTD., no hydrophobic treatment was carried out) having an average primary particle diameter of 12 nm, 82 parts by mass of a liquid paraffin "SMOIL P-350P" (trademark, made by Matsumura Oil Research Corp.) as a plasticizer, and 0.3 part by mass of pentaerythrityl-tetrakis-[3-(3,5-di-t-butyl-4-hydroxyphenyl)propionate] as an antioxidant were added, and preliminarily mixed by a henschel mixer. The resultant mixture was fed into a feeding inlet of a twin screw extruder in which two screws rotate in the same direction by a feeder. Melt-kneading by the extruder was carried out under the conditions of a setting temperature of 160° C., a screw rotation speed of 180 rpm, and a discharge amount of 12 kg/h. Subsequently, the melt-kneaded article was extruded into a sheet form, through a gear pump, a conducting tube and a T-die, which were respectively set at a temperature of 160° C., rapidly cooled by a water bath and a sheet-form molded article with a thickness of about 5 mm was obtained. The obtained sheet-form molded article was preliminarily heated at 150° C., and then rolled by heating at 120° C. to obtain a sheet-form molded article with a thickness of 0.2 mm. The liquid paraffin was removed from the obtained sheet-form molded article using methylene chloride, and then the sheet-form molded article was subjected to simultaneous biaxial stretching by 2 times in the longitudinal direction and 2 times in the lateral direction by using a biaxial stretching machine made by Iwamoto Seisakusyo Co. at 120° C. Then, the residual liquid paraffin was removed in methylene chloride in the state of fixing at four corners with a stainless flame, thereafter drying at room temperature to obtain a microporous membrane. Membrane preparation conditions and membrane characteristics are shown in Table 5.

Comparative Example 7

22 parts by mass of an ultra-high molecular weight polyethylene "UH850" (trademark, made by Asahi Kasei Chemicals Corporation) having Mv of 2,000,000, 25 parts by mass of silica "Aerosil 200" (trademark, made by NIPPON AEROSIL CO., LTD., no hydrophobic treatment was carried out) having an average primary particle diameter of 12 nm, 53 parts by mass of a liquid paraffin "SMOIL P-350P" (trademark, made by Matsumura Oil Research Corp.) as a plasticizer, and 0.3 part by mass of pentaerythrityl-tetrakis-[3-(3,5-di-t-butyl-4-hydroxyphenyl)propionate] as an antioxidant were added, and preliminarily mixed by a super mixer. The resultant mixture was fed into a feeding inlet of a twin screw extruder in which two screws rotate in the same direction by a feeder. Melt-kneading by the extruder was carried out under the conditions of a setting temperature of 200° C., a screw rotation speed of 180 rpm, and a discharge amount of 12 kg/h. Subsequently, the melt-kneaded article was extruded into a sheet form between cooling rolls controlled at a surface temperature of 25° C., through a gear pump, a conducting tube and a T-die, which were respectively set at a temperature of 200° C. to obtain a sheet from polyolefin composition with a thickness of 200 µm. Then, continuously leading to a roll stretching machine, the sheet from polyolefin composition was subjected to uniaxial stretching by 6 times in the longitudinal direction. In this time, the setting temperature of the roll stretching machine was 120° C. Then, leading to a methylene chloride vessel, the sheet from polyolefin composition was sufficiently immersed into methylene chloride to extract and remove the liquid paraffin. Then, the methylene chloride was dried. Membrane preparation conditions and membrane characteristics are shown in Table 5.

Comparative Example 8

A microporous membrane was obtained in the same manner as in Example 1 except for changing the silica in Example 1 to alumina "AKP-50" (made by SUMIKA ALCHEM Co., Ltd., no hydrophobic treatment was carried out) having an average primary particle diameter of 200 nm. Membrane preparation conditions and membrane characteristics are shown in Table 5.

Comparative Example 9

36 parts by mass of high density polyethylene "SH800" (trademark, made by Asahi Kasei Chemicals Corporation) having a viscosity average molecular weight (Mv) of 270,000, 9 parts by mass of homopolypropylene "H-100M" (made by Prime Polymer Co., Ltd.) having Mv of 400,000, and 0.3 part by mass of pentaerythrityl-tetrakis-[3-(3,5-di-t-butyl-4-hydroxyphenyl)propionate] as an antioxidant were added and preliminarily mixed by a henschel mixer. The resultant mixture was fed into a feeding inlet of a twin screw extruder in which two screws rotate in the same direction by a feeder, and then, a microporous membrane was obtained by the procedure in the same manner as in Comparative Example 2. Membrane preparation conditions and membrane characteristics are shown in Table 5.

(Evaluation Examples of Battery Performance)

a. Preparation of cathode

A slurry is prepared by dispersing 92.2% by mass of a lithium cobalt complex oxide ($LiCoO_2$) as a cathode active material, respectively 2.3% by mass of scale-like graphite and acetylene black as conductors, and 3.2% by mass of polyvinylidene fluoride (PVDF) as a binder into N-methylpyrrolidone (NMP). This slurry is coated on one surface of an aluminum foil with a thickness of 20 µm that is to be a cathode collector by a die coater and dried at 130° C. for 3 minutes, and then subjected to compression molding by a roll pressing machine. In this time, a coating amount of the cathode active material is adjusted at 250 $g/m^2$, and a bulk density of the active material is adjusted at 3.00 $g/cm^3$.

b. Preparation of Anode

A slurry is prepared by dissolving 96.6% by mass of artificial graphite as an anode active material, 1.4% by mass of an ammonium salt of carboxymethylcellulose as a binder and 1.7% by mass of a styrene-butadiene copolymer latex in a refined water. This slurry was coated on one surface of a copper foil with a thickness of 12 µm that is to be an anode collector by a die coater and dried at 120° C. for 3 minutes, and then subjected to compression molding by a roll pressing machine. In this time, a coating amount of the anode active material is adjusted at 106 $g/m^2$, and a bulk density of the active material is adjusted at 1.35 $g/cm^3$.

c. Nonaqueous Electrolyte

A nonaqueous electrolyte is prepared by dissolving $LiPF_6$ as a solute in a mixed solvent of ethylene carbonate: ethyl methyl carbonate=1:2 (volume ratio) so as to have a concentration of 1.0 mol/L.

d. Battery Composition

A separator is cut out in a circular shape with 30 mmφ, and a cathode and an anode are cut out in a circular shape with 16 mmφ, and the anode, a copper powder (75 µm, made by Wako Pure Chemical Industries, Ltd.), the separator, and the cathode are sequentially laminated so that active material surfaces of the cathode and the anode are opposed each other, and housed in a stainless metallic container with a lid. The container and the lid are insulated, the container is in contact with a copper foil of the anode, and the lid is in contact with an aluminum foil of the cathode. The above nonaqueous electrolyte is charged in this container and the container is sealed. After being left stood at room temperature for one day, the first charge is carried out for 8 hours in total after preparation of a battery by a method for charging until 4.2 V of a battery voltage at 2.0 mA (0.33 C) of a current value under an atmosphere at 25° C., and after reaching, starting to lower the current value from 2.0 mA in order to allowing the voltage to maintain at 4.2 V. Subsequently, discharge was carried out until a battery voltage of 3.0 V at a current value of 2.0 mA (0.33 C).

e. Cycle Evaluation 100 cycles of discharge are carried out under an atmosphere at 45° C. Charge is carried out for 3 hours in total by a method for charging until 4.2 V of a battery voltage at 6.0 mA (1.0 C) of a current value, and after reaching, starting to lower the current value from 6.0 mA in order to allow the voltage to maintain at 4.2 V. Discharge is carried out until a battery voltage of 3.0 V at a current value of 6.0 mA (1.0 C). After 100 cycles, discharge was carried out until a battery voltage of 3.0 V at a current value of 6 mA (1.0 C) under an atmosphere at 25° C.

The separator is taken out from this battery, and in order to remove an attachment, washing with an ultrasonic wave is performed in dimethoxyethane, ethanol, and 1 N hydrochloric acid each for 15 minutes. After sufficiently washing with water, the separator is dried in the air, and compression resistance of the separator is tested.

f. Evaluation of Separator

Using a breakdown voltage/insulating resistance tester "TOS9201" (trademark, made by KIKUSUI ELECTRONICS CORPORATION), breakdown voltages before and after the cycle evaluation are measured. In the measurement, the separator is sandwiched between flat metal plates, a voltage is given at a speed of 1 kV/sec., and a voltage value at which shot-circuit is shown is measured (alternate current of 60 Hz). Comparing a breakdown voltage maintenance ratio after the cycle evaluation with a breakdown voltage before the cycle evaluation, compression resistance under long-term pressurization as a separator for a battery was tested.

Compression resistance (%)=(Breakdown voltage after cycle evaluation (kV))/(Breakdown voltage before cycle evaluation (kV))×100

Results of compression resistance in Examples 1 to 16 and Comparative Examples 1 to 10 are shown in Tables 6 to 10.

TABLE 1

| | | Unit | Example 1 | Example 2 | Example 3 | Example 4 | Example 5 |
|---|---|---|---|---|---|---|---|
| Polyolefin | Kind | — | PE | PE | PE | PE | PE |
| | Mv | — | 270,000/ 2,000,000 | 270,000/ 2,000,000 | 270,000/ 2,000,000 | 270,000 | 270,000 |
| Inorganic particle | Kind | — | $SiO_2$ | $SiO_2$ | $SiO_2$ | $SiO_2$ | $SiO_2$ |
| | Particle diameter | nm | 15 | 15 | 15 | 15 | 15 |
| | Content | Mass % | 40 | 55 | 20 | 40 | 20 |
| Microporous membrane characteristics | Membrane thickness | μm | 17 | 20 | 19 | 21 | 20 |
| | Porosity | % | 51 | 55 | 56 | 56 | 54 |
| | Air permeability | sec./100 cc | 110 | 80 | 150 | 90 | 150 |
| | Mv | — | 860,000 | 1,200,000 | 860,000 | 250,000 | 250,000 |
| | Puncture strength | N | 5.6 | 4.2 | 5.8 | 4.3 | 4.6 |
| | | N/20 μm | 6.6 | 4.2 | 6.1 | 4.1 | 4.6 |
| | Shutdown temperature | °C. | 160 or more | 160 or more | 155 | 160 or more | 151 |
| | Membrane thickness retention ratio | % | 35 | 44 | 31 | 29 | 23 |
| | Membrane thickness reduction rate | % | 4.2 | 3.8 | 6.2 | 5.0 | 9.2 |
| | Heat resistance evaluation (1) | Ω | $10^6$ or more | $10^6$ or more | 2500 | $10^6$ or more | 1300 |
| | Heat resistance evaluation (2) | Ω | 3000 | $10^6$ or more | Less than 10 | 1500 | Less than 10 |
| | Heat resistance evaluation (3) | Ω | Less than 10 | Less than 10 | Less than 10 | Less than 10 | Less than 10 |

TABLE 2

| | | Unit | Example 6 | Example 7 | Example 8 | Example 9 | Example 10 |
|---|---|---|---|---|---|---|---|
| Polyolefin | Kind | — | PE | PE | PE | PE | PE |
| | Mv | — | 270,000/ 2,000,000 | 270,000/ 2,000,000 | 270,000/ 2,000,000 | 270,000/ 2,000,000 | 270,000/ 2,000,000 |
| Inorganic particle | Kind | — | $SiO_2$ | $SiO_2/SiO_2$ | $Al_2O_3$ | $Al_2O_3$ | $CaCO_3$ |
| | Particle diameter | nm | 12 | 15 | 13 | 13 | 30 |
| | Content | Mass % | 40 | 40 | 40 | 55 | 40 |
| Microporous membrane characteristics | Membrane thickness | μm | 17 | 9 | 17 | 18 | 17 |
| | Porosity | % | 50 | 48 | 54 | 54 | 53 |
| | Air permeability | sec./100 cc | 120 | 60 | 100 | 120 | 120 |
| | Mv | — | 860,000 | 860,000 | 860,000 | 1,200,000 | 860,000 |
| | Puncture strength | N | 5.6 | 4.8 | 6.2 | 5.1 | 5.2 |
| | | N/20 μm | 6.6 | 10.7 | 7.3 | 5.7 | 6.1 |
| | Shutdown temperature | °C. | 160 or more | 160 or more | 160 or more | 160 or more | 160 or more |
| | Membrane thickness retention ratio | % | 37 | 48 | 30 | 38 | 34 |
| | Membrane thickness reduction rate | % | 5.4 | 3.4 | 5.2 | 3.8 | 6.2 |
| | Heat resistance evaluation (1) | Ω | $10^6$ or more | $10^6$ or more | $10^6$ or more | $10^6$ or more | $10^6$ or more |
| | Heat resistance evaluation (2) | Ω | 8000 | 5000 | 2000 | 9000 | 1200 |
| | Heat resistance evaluation (3) | Ω | Less than 10 | Less than 10 | Less than 10 | Less than 10 | Less than 10 |

TABLE 3

| | | Unit | Example 11 | Example 12 | Example 13 | Example 14 | Example 15 | Example 16 |
|---|---|---|---|---|---|---|---|---|
| Polyolefin | Kind | — | PE/PP | PE/PP | PE/PP | PE/PP | PE/PP | PE/PP |
| | Mv | — | 270,000/ 2,000,000/ 400,000 | 270,000/ 2,000,000/ 400,000 | 270,000/ 2,000,000/ 400,000 | 270,000/ 2,000,000/ 400,000 | 270,000/ 2,000,000/ 400,000 | 270,000/ 2,000,000/ 400,000 |

TABLE 3-continued

|  |  | Unit | Example 11 | Example 12 | Example 13 | Example 14 | Example 15 | Example 16 |
|---|---|---|---|---|---|---|---|---|
| Inorganic particle | Kind | — | $Al_2O_3$ | $Al_2O_3$ | $Al_2O_3$ | $SiO_2$ | $SiO_2$ | $TiO_2$ |
|  | Particle diameter | nm | 13 | 13 | 13 | 15 | 15 | 50 |
|  | Content | Mass % | 40 | 55 | 55 | 40 | 40 | 40 |
| Microporous membrane characteristics | Membrane thickness | μm | 18 | 20 | 19 | 19 | 20 | 22 |
|  | Porosity | % | 53 | 58 | 56 | 52 | 50 | 62 |
|  | Air permeability | sec./100 cc | 120 | 100 | 90 | 140 | 190 | 70 |
|  | Mv | — | 820,000 | 820,000 | 850,000 | 820,000 | 780,000 | 820,000 |
|  | Puncture strength | N | 5.2 | 4.0 | 4.7 | 5.2 | 4.1 | 5.0 |
|  |  | N/20 μm | 5.8 | 4.0 | 4.9 | 5.5 | 4.1 | 4.5 |
|  | Shutdown temperature | °C. | 160 or more | 160 or more | 160 or more | 160 or more | 156 | 160 or more |
|  | Membrane thickness retention ratio | % | 29 | 36 | 38 | 32 | 26 | 25 |
|  | Membrane thickness reduction rate | % | 5.0 | 3.6 | 3.8 | 5.0 | 6.0 | 5.8 |
|  | Heat resistance evaluation (1) | Ω | $10^6$ or more | $10^6$ or more | $10^6$ or more | $10^6$ or more | $10^6$ or more | $10^6$ or more |
|  | Heat resistance evaluation (2) | Ω | $10^6$ or more | $10^6$ or more | $10^6$ or more | $10^6$ or more | $10^6$ or more | $10^6$ or more |
|  | Heat resistance evaluation (3) | Ω | $10^6$ or more | $10^6$ or more | 3000 | $10^6$ or more | $10^6$ or more | $10^6$ or more |

TABLE 4

|  |  | Unit | Comparative Example 1 | Comparative Example 2 | Comparative Example 3 | Comparative Example 4 |
|---|---|---|---|---|---|---|
| Polyolefin | Kind | — | PE | PE | PE | PE |
|  | Mv | — | 270,000/ 2,000,000 | 270,000 | 270,000/ 2,000,000 | 270,000 |
| Inorganic particle | Kind | — | $SiO_2$ | — | $Al_2O_3$ | $CaCO_3$ |
|  | Particle diameter | nm | 15 | — | 700 | 1500 |
|  | Content | Mass % | 5 | — | 40 | 60 |
| Microporous membrane characteristics | Membrane thickness | μm | 16 | 19 | 22 | 30 |
|  | Porosity | % | 46 | 42 | 55 | 68 |
|  | Air permeability | sec./100 cc | 180 | 240 | 160 | 250 |
|  | Mv | — | 860,000 | 250,000 | 860,000 | 250,000 |
|  | Puncture strength | N | 5.2 | 4.0 | 3.2 | 1.8 |
|  |  | N/20 μm | 6.5 | 4.2 | 2.9 | 1.2 |
|  | Shutdown temperature | °C. | 143 | 135 | 146 | 140 |
|  | Membrane thickness retention ratio | % | 14 | 9 | 14 | 4 |
|  | Membrane thickness reduction rate | % | 12.4 | 12.2 | 10.6 | 14.6 |
|  | Heat resistance evaluation (1) | Ω | Less than 10 | Less than 10 | Less than 10 | Less than 10 |
|  | Heat resistance evaluation (2) | Ω | Less than 10 | Less than 10 | Less than 10 | Less than 10 |
|  | Heat resistance evaluation (3) | Ω | Less than 10 | Less than 10 | Less than 10 | Less than 10 |

TABLE 5

|  |  | Unit | Comparative Example 5 | Comparative Example 6 | Comparative Example 7 | Comparative Example 8 | Comparative Example 9 |
|---|---|---|---|---|---|---|---|
| Polyolefin | Kind | — | PE | PE | PE | PE | PE/PP |
|  | Mv | — | 270,000/ 2,000,000 | 2,680,000 | 2,000,000 | 270,000/ 2,000,000 | 270,000/ 400,000 |
| Inorganic particle | Kind | — | $SiO_2$ | $SiO_2$ | $SiO_2$ | $Al_2O_3$ | — |
|  | Particle diameter | nm | 6000 | 12 | 12 | 200 | — |
|  | Content | Mass % | 25 | 56 | 53 | 40 | — |
| Microporous membrane characteristics | Membrane thickness | μm | 19 | 18 | 40 | 20 | 19 |
|  | Porosity | % | 55 | 64 | 50 | 53 | 39 |
|  | Air permeability | sec./100 cc | 160 | 80 | 600 | 140 | 520 |
|  | Mv | — | 860,000 | 2,500,000 | 1,720,000 | 860,000 | 280,000 |
|  | Puncture strength | N | 5.7 | 2.0 | 2.4 | 3.8 | 3.0 |
|  |  | N/20 μm | 6.0 | 2.2 | 1.2 | 3.8 | 3.2 |
|  | Shutdown temperature | °C. | 143 | 160 or more | 160 or more | 148 | 138 |
|  | Membrane thickness retention ratio | % | 11 | 12 | 22 | 15 | 7 |
|  | Membrane thickness reduction rate | % | 10.5 | 9.0 | 7.0 | 8.8 | 12.4 |

TABLE 5-continued

|  | Unit | Comparative Example 5 | Comparative Example 6 | Comparative Example 7 | Comparative Example 8 | Comparative Example 9 |
|---|---|---|---|---|---|---|
| Heat resistance evaluation (1) | Ω | Less than 10 | $10^6$ or more | $10^6$ or more | Less than 10 | Less than 10 |
| Heat resistance evaluation (2) | Ω | Less than 10 | 2000 | $10^6$ or more | Less than 10 | Less than 10 |
| Heat resistance evaluation (3) | Ω | Less than 10 | Less than 10 | Less than 10 | Less than 10 | Less than 10 |

TABLE 6

|  |  | Unit | Example 1 | Example 2 | Example 3 | Example 4 | Example 5 |
|---|---|---|---|---|---|---|---|
| Breakdown voltage | Before cycle evaluation | kV | 1.8 | 2.0 | 2.0 | 1.8 | 1.7 |
|  | After cycle evaluation | kV | 1.6 | 1.9 | 1.6 | 1.4 | 1.2 |
| Compression resistance |  | % | 89 | 95 | 80 | 78 | 71 |

TABLE 7

|  |  | Unit | Example 6 | Example 7 | Example 8 | Example 9 | Example 10 |
|---|---|---|---|---|---|---|---|
| Breakdown voltage | Before cycle evaluation | kV | 1.8 | 1.2 | 1.7 | 1.6 | 1.8 |
|  | After cycle evaluation | kV | 1.5 | 1.1 | 1.3 | 1.4 | 1.4 |
| Compression resistance |  | % | 83 | 92 | 76 | 88 | 78 |

TABLE 8

|  |  | Unit | Example 11 | Example 12 | Example 13 | Example 14 | Example 15 | Example 16 |
|---|---|---|---|---|---|---|---|---|
| Breakdown voltage | Before cycle evaluation | kV | 1.8 | 1.9 | 2.0 | 1.9 | 1.5 | 1.4 |
|  | After cycle evaluation | kV | 1.5 | 1.7 | 1.7 | 1.6 | 1.1 | 1.0 |
| Compression resistance |  | % | 83 | 89 | 85 | 84 | 73 | 71 |

TABLE 9

|  |  |  | Comp. Example 1 | Comp. Example 2 | Comp. Example 3 | Comp. Example 4 |
|---|---|---|---|---|---|---|
| Breakdown voltage | Before cycle evaluation | kV | 1.8 | 2.1 | 1.6 | 1.4 |
|  | After cycle evaluation | kV | 1.1 | 0.9 | 1.0 | 0.5 |
| Compression resistance |  | % | 61 | 43 | 63 | 36 |

TABLE 10

|  |  |  | Comp. Example 5 | Comp. Example 6 | Comp. Example 7 | Comp. Example 8 | Comp. Example 9 |
|---|---|---|---|---|---|---|---|
| Breakdown voltage | Before cycle evaluation | kV | 2.0 | 1.4 | 3.2 | 1.7 | 2.2 |
|  | After cycle evaluation | kV | 1.2 | 0.9 | 2.1 | 1.1 | 1.1 |
| Compression resistance |  | % | 60 | 64 | 66 | 65 | 50 |

As apparent from Tables 1 to 10, the microporous membrane of the present invention has high puncture strength and is excellent in compression resistance in a state of continuous pressurization, and in particular, is a microporous membrane excellent in safety and reliability as a separator for an accumulator battery such as a nonaqueous electrolyte battery.

INDUSTRIAL APPLICABILITY

The microporous membrane of the present invention can be preferably used as a separator for an accumulator battery such as a nonaqueous electrolyte battery etc., or one constituting member for a fuel battery, a moisturizing membrane, a filtration membrane, and the like, which are excellent in safety and reliability. In particular, the microporous membrane of the present invention is useful in the battery field for an electric automobile and a hybrid automobile.

EXPLANATIONS OF LETTERS OR NUMERALS

Figure 1:
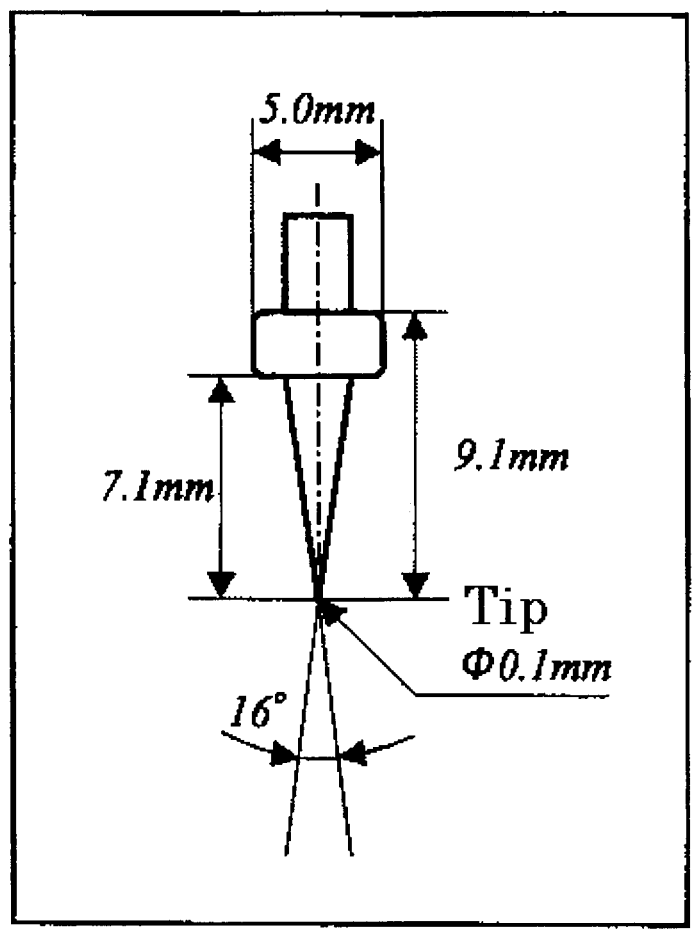
FIG. 1 is a schematic view showing a needle-like probe used at a tip part in the penetration creep test.
Figure 2:
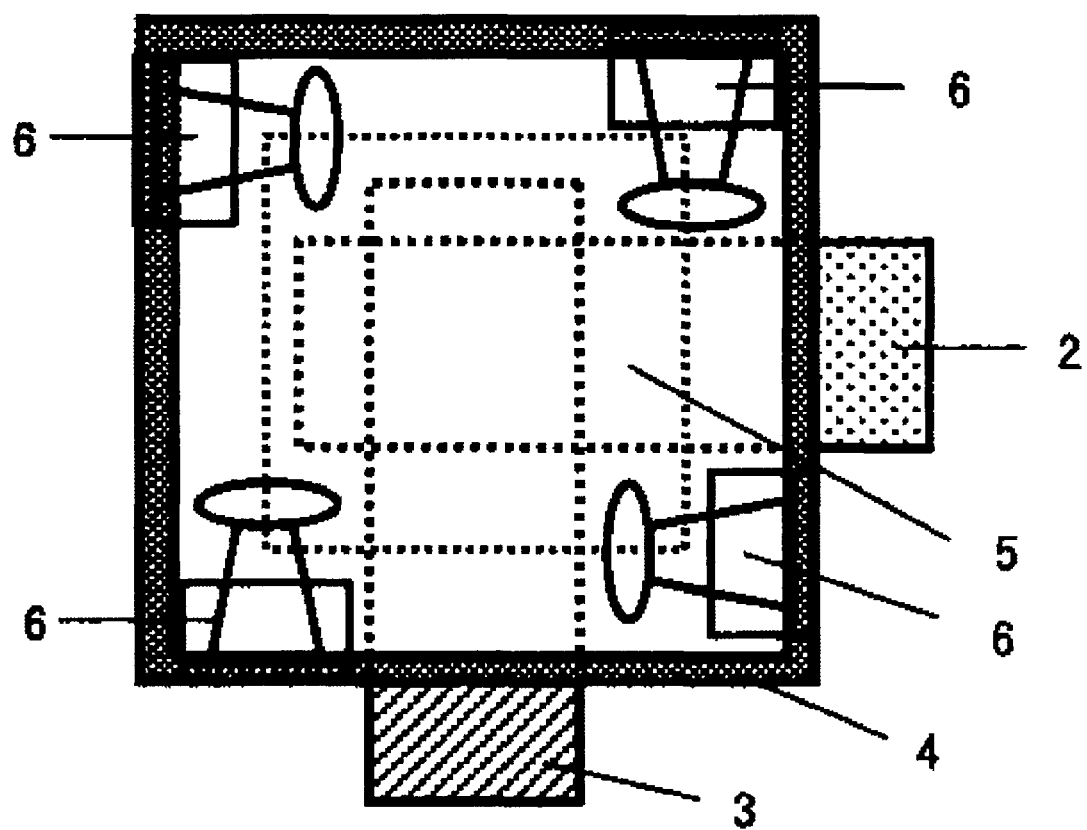
FIG. 2 is a schematic view (upper surface view) showing a cell used in the heat resistance evaluation.
Figure 3:
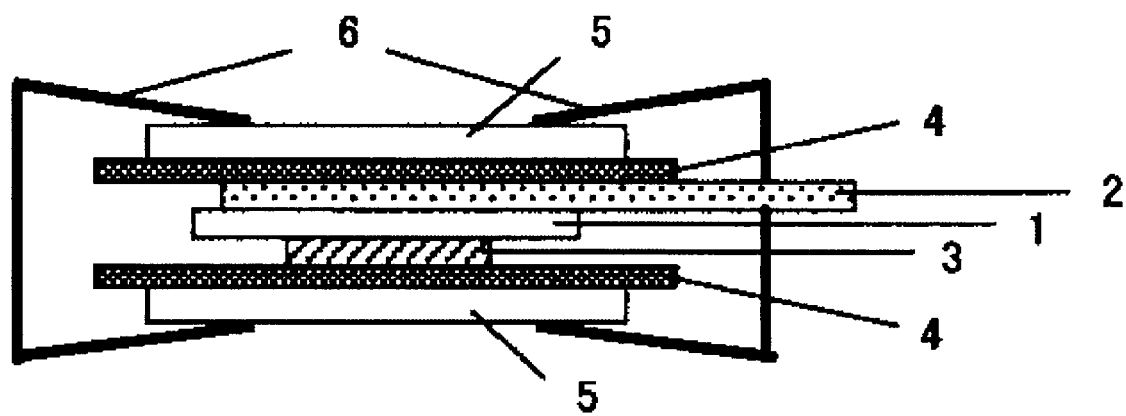
FIG. 3 is a schematic view (cross-section view) showing a cell used in the heat resistance evaluation.

1 Microporous membrane
2 Cathode
3 Anode
4 PET film
5 SUS plate
6 Double clip

The invention claimed is:

1. A lithium ion secondary battery comprising a separator comprising a polyolefin microporous membrane comprising a polyolefin resin and inorganic particles, wherein the polyolefin resin comprises a composition containing polypropylene is contained in an amount of 20% by weight or more and 40% by weight or less in 100% by weight of polyolefin resin, wherein the microporous membrane has a puncture strength of 3 N/20 µm or more, a membrane thickness retention ratio in penetration creep of 23% or more and 48% or less and a shutdown temperature of more than 160° C. wherein the inorganic particle content is 20% by mass or more and less than 60% by mass, and wherein particle diameter of the inorganic particle is 1 nm or more and less than 100 nm, and at least a part of the inorganic particles are fused with polyolefin.

2. The lithium ion secondary battery according to claim 1, wherein the microporous membrane has a membrane thickness reduction rate in penetration creep of 10% or less.

3. The lithium on secondary battery according to claim 1 or 2, wherein the inorganic particles comprise one, or two or more kinds selected from oxides and nitrides of silicon, aluminum and titanium, and carbonates and sulfates of calcium and barium.

4. The lithium on secondary battery according claim 1 wherein inorganic particles having a hydrophilic group and inorganic particles subjected to a hydrophobic treatment are used in combination as the inorganic particles.

5. The lithium on secondary battery according to claim 4, wherein the inorganic particles having a hydrophilic group in a proportion of 1% by weight or more and less than 50% by weight of all inorganic particles and the inorganic particles subjected to a hydrophobic treatment in a proportion of 50% by weight or more and less than 99% by weight of all inorganic particles are used in combination.

6. The lithium on secondary battery according to claim 1, wherein a viscosity average molecular weight of the microporous membrane is 50,000 or more and 500,000 or less.

7. The lithium on secondary battery according to claim 1, wherein a viscosity average molecular weight of the microporous membrane is more than 500,000 and less than 2,000,000.

8. A method for producing a polyolefin microporous membrane for the lithium secondary battery according to claim 1, comprising the steps of:
    (1) melt-kneading a polyolefin resin, inorganic particles and a plasticizer to obtain a molten substance;
    (2) transferring the molten substance and molding into a sheet form, thereafter solidifying by cooling to obtain a sheet;
    (3) stretching the sheet at least in a uniaxial direction by a surface stretching ratio of 20 times or more and less than 200 times; and
    (4) extracting the plasticizer after the stretching step (3), wherein a temperature from transferring the molten substance until molding into a sheet form in (2) is set at higher than a preset temperature in the melt-kneading step.

9. The method for producing a polyolefin microporous membrane according to claim 8, comprising stretching in a biaxial direction in the stretching step (3).

* * * * *